(12) United States Patent
Sahraei et al.

(10) Patent No.: US 11,817,986 B2
(45) Date of Patent: Nov. 14, 2023

(54) CARRIER AGGREGATION PEAK TO AVERAGE POWER RATIO REDUCTION USING PEAK REDUCTION TONES

(71) Applicant: QUALCOMM Incorporated, San Diego, CA (US)

(72) Inventors: Saeid Sahraei, San Diego, CA (US); Gokul Sridharan, Sunnyvale, CA (US); Wei Yang, San Diego, CA (US); Krishna Kiran Mukkavilli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 145 days.

(21) Appl. No.: 17/369,518

(22) Filed: Jul. 7, 2021

(65) Prior Publication Data
US 2022/0014409 A1    Jan. 13, 2022

Related U.S. Application Data

(60) Provisional application No. 63/050,056, filed on Jul. 9, 2020.

(51) Int. Cl.
*H04L 27/26*    (2006.01)
(52) U.S. Cl.
CPC ...... *H04L 27/2618* (2013.01); *H04L 27/2621* (2013.01)
(58) Field of Classification Search
CPC .............. H04L 27/2618; H04L 27/2621; H04L 5/0094; H04L 5/0035; H04L 5/001; H04L 27/0006
See application file for complete search history.

(56) References Cited

U.S. PATENT DOCUMENTS

2018/0083820 A1   3/2018 Agon
2021/0266036 A1*  8/2021 Namgoong .............. G06N 3/08
(Continued)

FOREIGN PATENT DOCUMENTS

KR     20100064665 A    6/2010
WO     WO-2010079788 A1  7/2010

OTHER PUBLICATIONS

International Search Report and Written Opinion—PCT/US2021/040884—ISA/EPO—dated Oct. 13, 2021 (206204WO).
(Continued)

*Primary Examiner* — Jay P Patel
(74) *Attorney, Agent, or Firm* — Arun Swain

(57) ABSTRACT

Peak to average power ratio (PAPR) reduction with respect to signals of component carriers of a carrier aggregation configuration may be provided using preconfigured or fixed PRT location sequences (e.g., fixing the number and location of PRTs). A device transmitting signals of component carriers of a carrier aggregation configuration may perform PRT magnitude and phase optimization processing with respect to PRTs of a PRT location sequence using techniques, such as may use a signal to clipping noise ratio, tone reservation (SCR-TR) algorithm. Various PRT location sequence configurations, such as PRT sideband location sequence configurations, PRT inband location sequence configurations, etc., may be selected to facilitate reduction of PAPR associated with the data tones of one or more carrier aggregation component carriers, such as to satisfy a PAPR threshold. Other aspects and features are also claimed and described.

36 Claims, 12 Drawing Sheets

(56) References Cited

U.S. PATENT DOCUMENTS

| | | | | |
|---|---|---|---|---|
| 2021/0344536 A1* | 11/2021 | Sahraei | ............... | H04L 27/2618 |
| 2021/0344537 A1* | 11/2021 | Sahraei | ................... | H04L 5/001 |
| 2021/0344543 A1* | 11/2021 | Sahraei | ............ | H04W 72/0453 |
| 2021/0344544 A1* | 11/2021 | Sahraei | ................ | H04L 5/0053 |
| 2021/0359890 A1* | 11/2021 | Sahraei | ............... | H04L 27/2614 |
| 2021/0360635 A1* | 11/2021 | Sahraei | ................ | H04W 72/53 |
| 2021/0377088 A1* | 12/2021 | Gaal | ................. | H04W 72/0453 |
| 2021/0377089 A1* | 12/2021 | Gaal | .................... | H04L 1/0009 |

OTHER PUBLICATIONS

Yen P., et al., "PAPR Reduction for Bandwidth-Aggregated OFDM and SC-FDMA Systems", 2011 IEEE Wireless Communications and Networking Conference (WCNC 2011), 2011 IEEE 2011-PHY, Mar. 2011, Cancun, Mexico, Mar. 28-31, 2011, IEEE, Piscataway, NJ, Mar. 28, 2011 (Mar. 28, 2011), XP031876448, pp. 1363-1368, DOI: 10.1109/WCNC.2011.5779328, ISBN: 978-1-61284-255-4, figure 1.

* cited by examiner

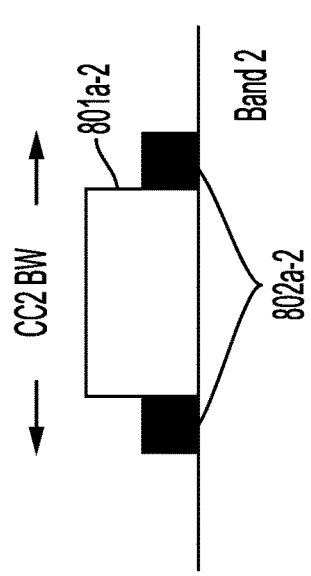
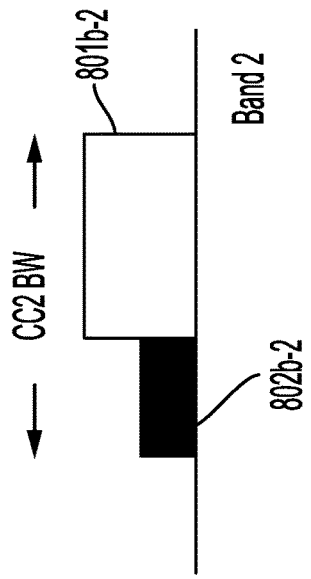
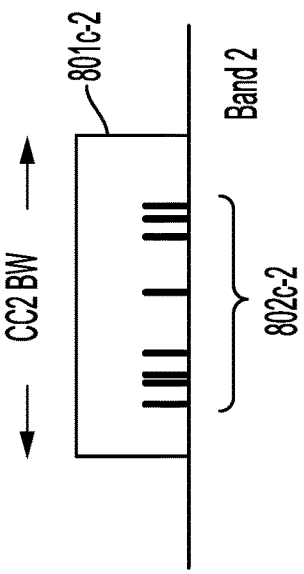
FIG. 8A
FIG. 8B
FIG. 8C

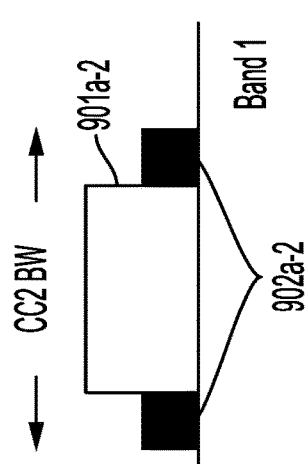
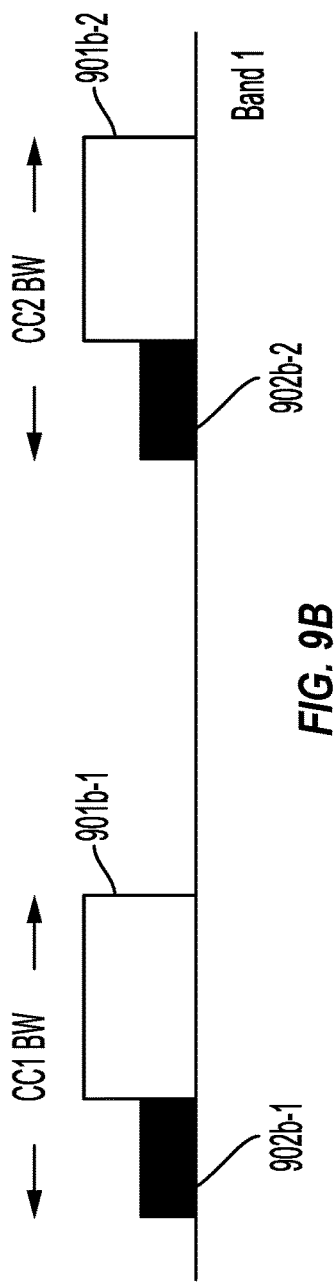
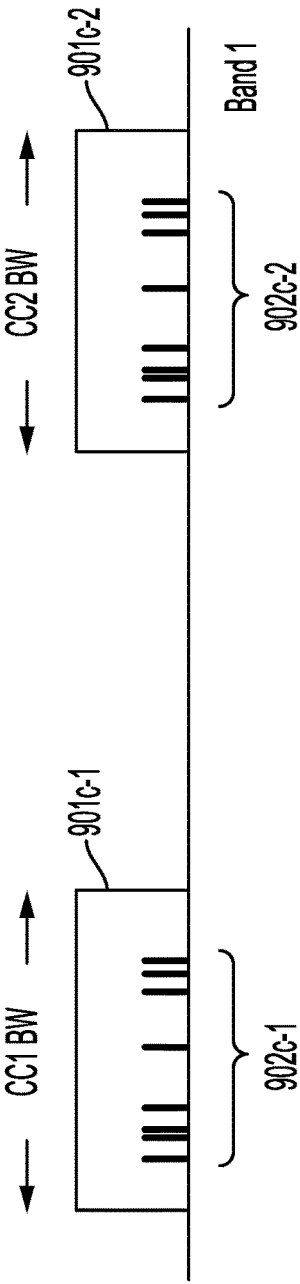
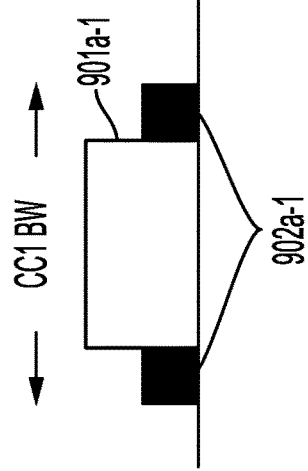
FIG. 9A
FIG. 9B
FIG. 9C

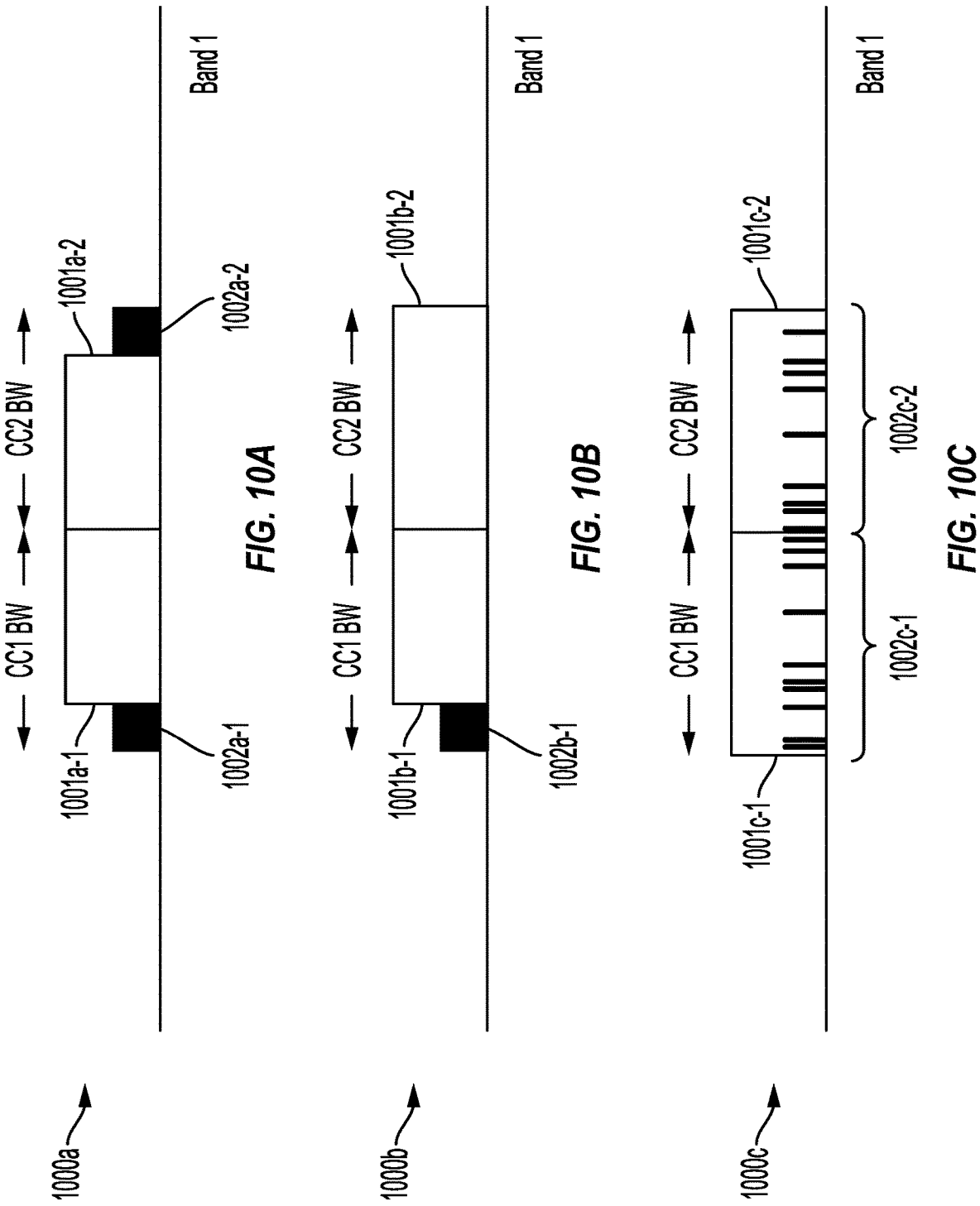

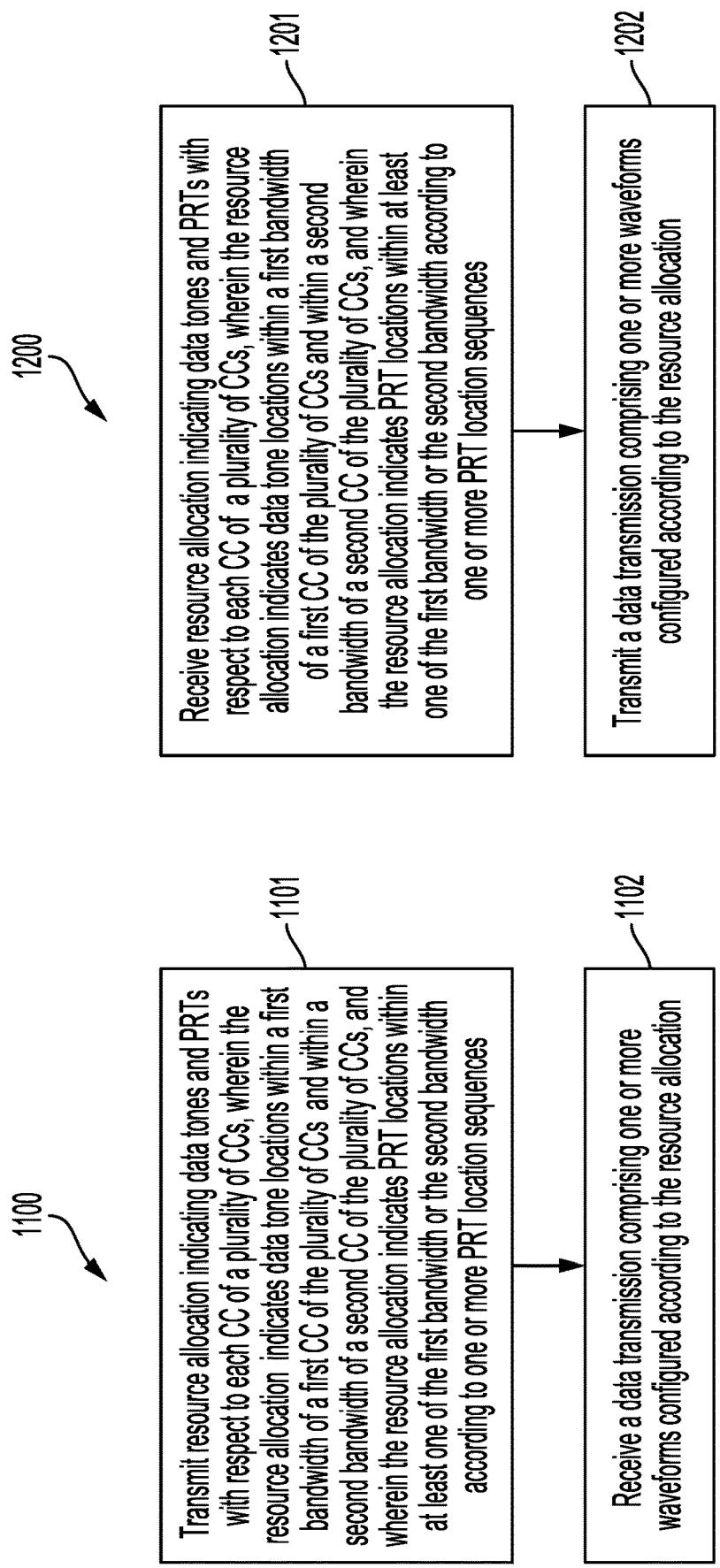

CARRIER AGGREGATION PEAK TO AVERAGE POWER RATIO REDUCTION USING PEAK REDUCTION TONES

CROSS-REFERENCE TO RELATED APPLICATIONS

This application claims the benefit of priority to U.S. Provisional Patent Application No. 63/050,056, entitled, "CARRIER AGGREGATION PEAK TO AVERAGE POWER RATIO REDUCTION USING PEAK REDUCTION TONES," filed on Jul. 9, 2020, (206204P1) the disclosure of which is hereby incorporated by reference herein in its entirety as if fully set forth below and for all applicable purposes.

TECHNICAL FIELD

Aspects of the present disclosure relate generally to wireless communication systems, and more particularly, to peak to average power ratio (PAPR) reduction techniques for wireless communications. Certain aspects and/or embodiments of the technology discussed below can enable and provide PAPR reduction using peak reduction tones (PRTs) with respect to component carriers of carrier aggregation configurations.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

Signal distortion caused by processing of signals for transmission, such as by signal amplification provided by a power amplifier (PA), may also degrade performance on both the downlink and uplink. For example, some signal waveforms suffer from large peak to average power ratio (PAPR) which can result in high peaks, causing a PA to operate in the nonlinear region. PA operation in the nonlinear region leads to signal distortion and spectral spreading of the signal.

SUMMARY

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method of wireless communication is provided. A method may include transmitting resource allocation indicating data tones and peak reduction tones (PRTs) with respect to each component carrier (CCs) of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. A method may also include receiving a data transmission comprising one or more waveforms configured according to the resource allocation.

In an additional aspect of the disclosure, an apparatus configured for wireless communication is provided. An apparatus may include means for transmitting resource allocation indicating data tones and PRTs with respect to each CCs of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. An apparatus may also include means for receiving a data transmission comprising one or more waveforms configured according to the resource allocation.

In an additional aspect of the disclosure, a non-transitory computer-readable medium having program code recorded thereon for wireless communication is provided. Program code may include code to transmit resource allocation indicating data tones and PRTs with respect to each CCs of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. Program code may also include code to receive a data transmission comprising one or more waveforms configured according to the resource allocation.

In an additional aspect of the disclosure, an apparatus configured for wireless communication is provided. The apparatus includes at least one processor and a memory coupled to the processor. A processor may be configured to transmit resource allocation indicating data tones and PRTs with respect to each CCs of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. A processor may also be configured to receive a data transmission comprising one or more waveforms configured according to the resource allocation.

In accordance with aspects of the disclosure, the foregoing systems, methods, and apparatuses may be implemented in combination with one or more additional features, such as the following features whether alone or in combination. For example, the above systems, methods, and apparatuses may include the one or more PRT location sequences including a PRT location sequence of a plurality of contiguously located PRTs, a PRT location sequence of a plurality of distributively located PRTs, or both. The above systems, methods, and apparatuses may include the one or more PRT location sequences providing a multi-sided PRT sideband location configuration relative to the data tones of the first CC. The above systems, methods, and apparatuses may include the one or more PRT location sequences providing a single-sided PRT sideband location configuration relative to the data tones of the first CC. The above systems, methods, and apparatuses may include the one or more PRT location sequences providing a multi-sided PRT sideband location configuration relative to the data tones of the first CC and a single-sided PRT sideband location configuration relative to the data tones of the second CC. The above systems, methods, and apparatuses may include the one or more PRT location sequences including a first PRT location sequence of a plurality of contiguously located PRTs. The above systems, methods, and apparatuses may include the contiguously located PRTs of the first PRT location sequence being located within the first bandwidth of the first CC and being configured such that peak to average power ratio (PAPR) of a waveform of the one or more waveforms corresponding to the first CC and of a waveform of the one or more waveforms corresponding to the second CC satisfies a PAPR threshold. The above systems, methods, and apparatuses may include the one or more PRT location sequences including a second PRT location sequence of a plurality of contiguously located PRTs. The above systems, methods, and apparatuses may include the contiguously located PRTs of the first PRT location sequence being located within the first bandwidth of the first CC and being configured such that PAPR of a waveform of the one or more waveforms corresponding to the first CC satisfies a PAPR threshold, and the contiguously located PRTs of the second PRT location sequence being located within the second bandwidth of the second CC and being configured such that PAPR of a waveform of the one or more waveforms corresponding to the second CC satisfies the PAPR threshold. The above systems, methods, and apparatuses may include the contiguously located PRTs of the first PRT location sequence and the contiguously located PRTs of the second PRT location sequence being located within the first bandwidth of the first CC and being configured such that PAPR of a waveform of the one or more waveforms corresponding to the first CC satisfies a PAPR threshold. The above systems, methods, and apparatuses may include the one or more PRT location sequences including a third PRT location sequence of a plurality of contiguously located PRTs and a fourth PRT location sequence of a plurality of contiguously located PRTs. The above systems, methods, and apparatuses may include the contiguously located PRTs of the first PRT location sequence and contiguously located PRTs of the second PRT location sequence being located within the first bandwidth of the first CC and being configured such that PAPR of a waveform of the one or more waveforms corresponding to the first CC satisfies a PAPR threshold, and the contiguously located PRTs of the third PRT location sequence and the contiguously located PRTs of the fourth PRT location sequence being located within the second bandwidth of the second CC and being configured such that PAPR of a waveform of the one or more waveforms corresponding to the second CC satisfies the PAPR threshold. The above systems, methods, and apparatuses may include the one or more PRT location sequences providing a PRT inband location configuration relative to the data tones of the first CC. The above systems, methods, and apparatuses may include the one or more PRT location sequences providing a PRT inband location configuration relative to the data tones of the first CC and a PRT sideband location configuration relative to the data tones of the second CC. The above systems, methods, and apparatuses may include the one or more PRT location sequences including a first PRT location sequence of a plurality of distributively located PRTs. The above systems, methods, and apparatuses may include the distributively located PRTs of the first PRT location sequence being located within the first bandwidth of the first CC interleaved with the data tones of the first CC and being configured such that PAPR of a waveform of the one or more waveforms corresponding to the first CC satisfies a PAPR threshold. The above systems, methods, and apparatuses may include the distributively located PRTs of the first PRT location sequence being located within the first bandwidth of the first CC interleaved with the data tones of the first CC and within the second bandwidth of the second CC interleaved with the data tones of the second CC and being configured such that PAPR of a waveform of the one or more waveforms corresponding to the first CC and of a waveform of the one or more waveforms corresponding to the second CC satisfies a PAPR threshold. The above systems, methods, and apparatuses may include the one or more PRT location sequences including a second PRT location sequence of a plurality of distributively located PRTs. The above systems, methods, and apparatuses may include the distributively located PRTs of the first PRT location sequence being located within the first bandwidth of the first CC interleaved with the data tones of the first CC and being configured such that PAPR of a waveform of the one or more waveforms corresponding to the first CC satisfies a PAPR threshold, and the distributively located PRTs of the second PRT location sequence being located within the second bandwidth of the second CC interleaved with the data tones of the second CC and being configured such that PAPR of a waveform of the one or more waveforms corresponding to the second CC satisfies the PAPR threshold. The above systems, methods, and apparatuses may include the distributively located PRTs being distributively located according to a Costas array. The above systems, methods, and apparatuses may include the distributively located PRTs being distributively located according to a Golomb ruler. The above systems, methods, and apparatuses may include the distributively located PRTs being distributively located according to a pseudo-random distribution. The above systems, methods, and apparatuses may include the first CC and the second CC being CCs of a carrier aggregation (CA) configuration. The above systems, methods, and apparatuses may include the first bandwidth of the first CC being within a first frequency range predefined for the CA configuration and the second bandwidth of the second CC being within a second frequency range predefined for the CA configuration, wherein the first frequency range and the second frequency range are non-contiguous. The above systems, methods, and apparatuses may include the first bandwidth of the first CC and the second bandwidth of the second CC being within a first frequency range predefined for the CA configuration. The above systems, methods, and apparatuses may include a frequency range of the first bandwidth of the first CC and a frequency range of the second bandwidth of the second CC being non-contiguous. The above systems, methods, and apparatuses may include a frequency range of the first bandwidth of the first CC and a frequency range of the second bandwidth of the second CC being contiguous.

In one aspect of the disclosure, a method of wireless communication is provided. A method may include receiving resource allocation indicating data tones and PRTs with respect to each CC of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. A method may also include transmitting a data transmission comprising one or more waveforms configured according to the resource allocation.

In an additional aspect of the disclosure, an apparatus configured for wireless communication is provided. An apparatus may include means for receiving resource allocation indicating data tones and PRTs with respect to each CC of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. An apparatus may also include means for transmitting a data transmission comprising one or more waveforms configured according to the resource allocation.

In an additional aspect of the disclosure, a non-transitory computer-readable medium having program code recorded thereon for wireless communication is provided. Program code may include code to receive resource allocation indicating data tones and PRTs with respect to each CC of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. Program code may also include code to transmit a data transmission comprising one or more waveforms configured according to the resource allocation.

In an additional aspect of the disclosure, an apparatus configured for wireless communication is disclosed. The apparatus includes at least one processor, and a memory coupled to the processor. A processor may be configured to receive resource allocation indicating data tones and PRTs with respect to each CC of a plurality of CCs. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences. A processor may also be configured to transmit a data transmission comprising one or more waveforms configured according to the resource allocation.

In accordance with aspects of the disclosure, the foregoing systems, methods, and apparatuses may be implemented in combination with one or more additional features, such as the following features whether alone or in combination. For example, the above systems, methods, and apparatuses may include the one or more PRT location sequences including a PRT location sequence of a plurality of contiguously located PRTs, a PRT location sequence of a plurality of distributively located PRTs, or both. The above systems, methods, and apparatuses may include performing PRT magnitude and phase optimization processing with respect to the PRTs of the one or more PRT location sequences prior to the transmitting. The above systems, methods, and apparatuses may include using a signal to clipping noise ratio, tone reservation (SCR-TR) algorithm for the PRT magnitude and phase optimization processing. The above systems, methods, and apparatuses may include the PRT magnitude and phase optimization processing facilitating reduction of PAPR of a waveform of the one or more waveforms corresponding to the first CC or the second CC satisfying a PAPR threshold. The above systems, methods, and apparatuses may include the one or more PRT location sequences providing a multi-sided PRT sideband location configuration relative to the data tones of the first CC. The above systems, methods, and apparatuses may include the one or more PRT location sequences providing a single-sided PRT sideband location configuration relative to the data tones of the first CC. The above systems, methods, and apparatuses may include the one or more PRT location sequences providing a multi-sided PRT sideband location configuration relative to the data tones of the first CC and a single-sided PRT sideband location configuration relative to the data tones of the second CC. The above systems, methods, and apparatuses may include the one or more PRT location sequences including a first PRT location sequence of a plurality of contiguously located PRTs. The above systems, methods, and apparatuses may include the contiguously located PRTs of the first PRT location sequence being located within the first bandwidth of the first CC and being configured such that PAPR of a waveform of the one or more waveforms corresponding to the first CC and of a waveform of the one or more waveforms corresponding to the second CC satisfies a PAPR threshold. The above systems, methods, and apparatuses may include the one or more PRT location sequences including a second PRT location sequence of a plurality of contiguously located PRTs. The above systems, methods, and apparatuses may include the contiguously located PRTs of the first PRT location sequence being located within the first bandwidth of the first CC and being configured such that PAPR of a waveform of the one or more waveforms corresponding to the first CC satisfies a PAPR threshold, and the contiguously located PRTs of the second PRT location sequence being located within the second bandwidth of the second CC and being configured such that PAPR of a waveform of the one or more waveforms corresponding to the second CC satisfies the PAPR threshold. The above systems, methods, and apparatuses may include the contiguously located PRTs of the first PRT location sequence and the contiguously located PRTs of the second PRT location sequence being located within the first bandwidth of the first CC and being configured such that PAPR of a waveform of the one or more waveforms corresponding to the first CC satisfies a PAPR threshold. The above systems, methods, and apparatuses may include the one or more PRT location sequences including a third PRT location sequence of a plurality of contiguously located PRTs and a fourth PRT location sequence of a plurality of contiguously located PRTs. The above systems, methods, and apparatuses may include the contiguously located PRTs of the first PRT location sequence and contiguously located PRTs of the second PRT location sequence being located within the first bandwidth of the first CC and being configured such that PAPR of a waveform of the one or more waveforms corresponding to the first CC satisfies a PAPR threshold, and the contiguously located PRTs of the third PRT location sequence and the contiguously located PRTs of the fourth PRT location sequence being located within the second bandwidth of the second CC and being configured such that PAPR of a waveform of the one or more waveforms corresponding to the second CC satisfies the PAPR threshold. The above systems, methods, and apparatuses may include the one or more PRT location sequences providing a PRT inband location configuration relative to the data tones of the first CC. The above systems, methods, and apparatuses may include the one or more PRT location sequences providing a PRT inband location configuration relative to the data tones of the first CC and a PRT sideband location configuration relative to the data tones of the second CC. The above systems, methods, and apparatuses may include the one or more PRT location sequences including a first PRT location sequence of a plurality of distributively located PRTs. The above systems, methods, and apparatuses may include the distributively located PRTs of the first PRT location sequence being located within the first bandwidth of the first CC interleaved with the data tones of the first CC and being configured such that PAPR of a waveform of the one or more waveforms corresponding to the first CC satisfies a PAPR threshold. The above systems, methods, and apparatuses may include the distributively located PRTs of the first PRT location sequence being located within the first bandwidth of the first CC interleaved with the data tones of the first CC and within the second bandwidth of the second CC interleaved with the data tones of the second CC and being configured such that PAPR of a waveform of the one or more waveforms corresponding to the first CC and of a waveform of the one or more waveforms corresponding to the second CC satisfies a PAPR threshold. The above systems, methods, and apparatuses may include the one or more PRT location sequences including a second PRT location sequence of a plurality of distributively located PRTs of the PRTs. The above systems, methods, and apparatuses may include the distributively located PRTs of the first PRT location sequence being located within the first bandwidth of the first CC interleaved with the data tones of the first CC and being configured such that PAPR of a waveform of the one or more waveforms corresponding to the first CC satisfies a PAPR threshold, and the distributively located PRTs of the second PRT location sequence being located within the second bandwidth of the second CC interleaved with the data tones of the second CC and being configured such that PAPR of a waveform of the one or more waveforms corresponding to the second CC satisfies the PAPR threshold. The above systems, methods, and apparatuses may include the distributively located PRTs being distributively located according to a Costas array. The above systems, methods, and apparatuses may include the distributively located PRTs being distributively located according to a Golomb ruler. The above systems, methods, and apparatuses may include the distributively located PRTs being distributively located according to a pseudo-random distribution. The above systems, methods, and apparatuses may include the first CC and the second CC being CCs of a CA configuration. The above systems, methods, and apparatuses may include the first bandwidth of the first CC being within a first frequency range predefined for the CA configuration and the second bandwidth of the second CC being within a second frequency range predefined for the CA configuration, wherein the first frequency range and the second frequency range are non-contiguous. The above systems, methods, and apparatuses may include the first bandwidth of the first CC and the second bandwidth of the second CC being within a first frequency range predefined for the CA configuration. The above systems, methods, and apparatuses may include a frequency range of the first bandwidth of the first CC and a frequency range of the second bandwidth of the second CC being non-contiguous. The above systems, methods, and apparatuses may include a frequency range of the first bandwidth of the first CC and a frequency range of the second bandwidth of the second CC being contiguous.

Other aspects, features, and embodiments will become apparent to those of ordinary skill in the art, upon reviewing the following description of specific, exemplary embodiments in conjunction with the accompanying figures. While features may be discussed relative to certain aspects and figures below, all embodiments can include one or more of the advantageous features discussed herein. In other words, while one or more aspects may be discussed as having certain advantageous features, one or more of such features may also be used in accordance with the various aspects. In similar fashion, while exemplary aspects may be discussed below as device, system, or method aspects, the exemplary aspects can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIGS. 8A, 8B, 9A, 9B, 10A, and 10B are frequency domain diagrams illustrating various example PRT sideband location sequence configurations according to some embodiments of the present disclosure.

FIGS. 8C, 9C, and 10C are frequency domain diagrams illustrating various example PRT inband location sequence configurations according to some embodiments of the present disclosure.

FIGS. 11 and 12 show example flows of operation by wireless devices facilitating carrier aggregation PAPR reduction according to some embodiments of the present disclosure.

DETAILED DESCRIPTION

Figure 1:
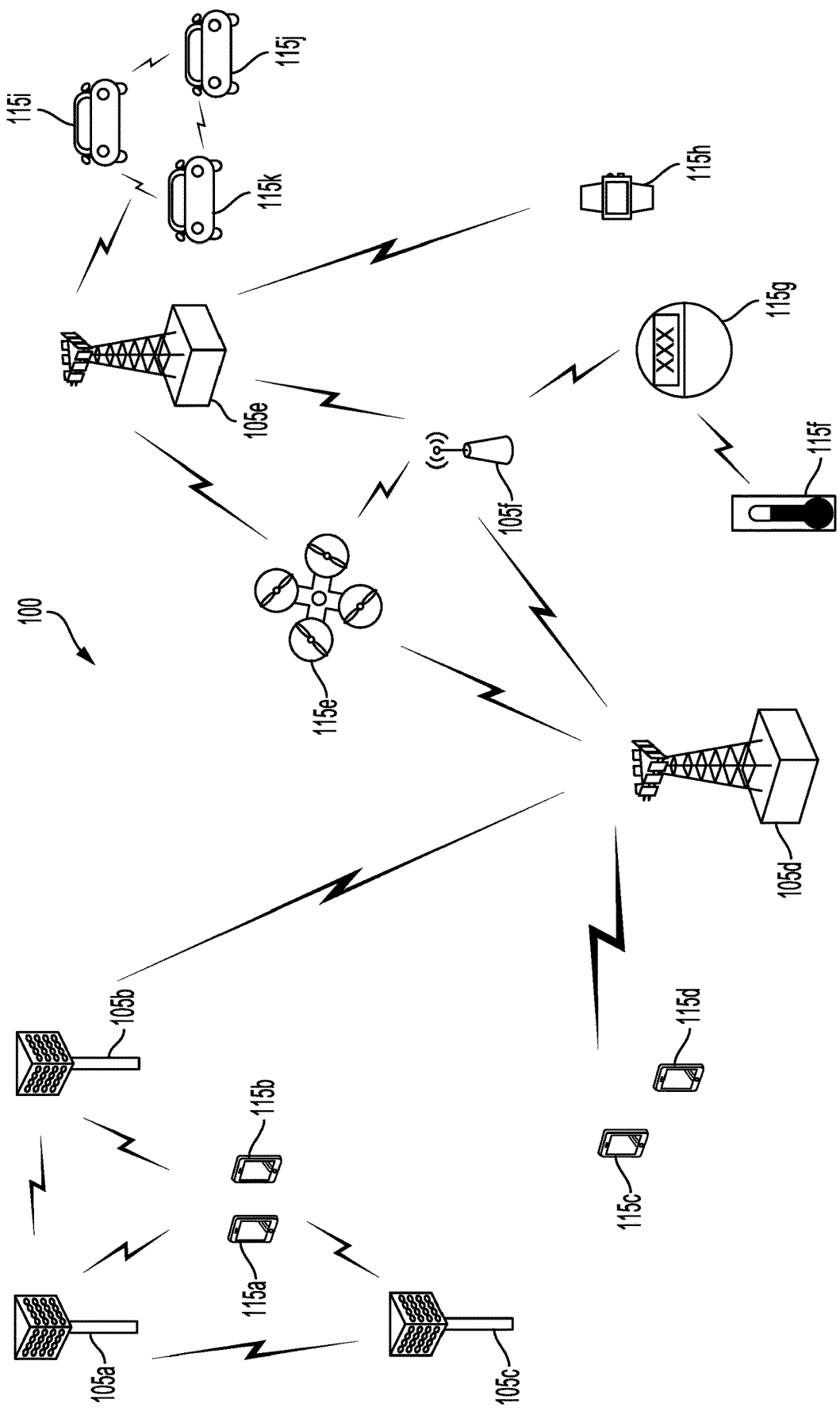
FIG. 1 is a block diagram illustrating details of a wireless communication system according to some embodiments of the present disclosure.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless devices in one or more wireless communications systems, also referred to as wireless communications networks. In various implementations, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks (sometimes referred to as "5G NR" networks/systems/devices), as well as other communications networks. As described herein, the terms "networks" and "systems" may be used interchangeably.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communication (GSM). The Third Generation Partnership Project (3GPP) defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with Universal Terrestrial Radio Access Networks (UTRANs) in the case of a UMTS/GSM network. Additionally, an operator network may also include one or more LTE networks, and/or one or more other networks. The various different network types may use different radio access technologies (RATs) and radio access networks (RANs).

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "$3^{rd}$ Generation Partnership Project" (3GPP), and cdma2000 is described in documents from an organization named "$3^{rd}$ Generation Partnership Project 2" (3GPP2). These various radio technologies and standards are known or are being developed. For example, the 3GPP is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure may describe certain aspects with reference to LTE, 4G, or 5G NR technologies; however, the description is not intended to be limited to a specific technology or application, and one or more aspects described with reference to one technology may be understood to be applicable to another technology. Indeed, one or more aspects of the present disclosure are related to shared access to wireless spectrum between networks using different radio access technologies or radio air interfaces.

5G networks contemplate diverse deployments, diverse spectrum, and diverse services and devices that may be implemented using an OFDM-based unified, air interface. To achieve these goals, further enhancements to LTE and LTE-A are considered in addition to development of the new radio technology for 5G NR networks. The 5G NR will be capable of scaling to provide coverage (1) to a massive Internet of Things (IoTs) with an ultra-high density (e.g., ~1M nodes/km2), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 millisecond (ms)), and users with wide ranges of mobility or lack thereof; and (3) with enhanced mobile broadband including extreme high capacity (e.g., ~10 Tbps/km2), extreme data rates (e.g., multi-Gbps rate, 100+ Mbps user experienced rates), and deep awareness with advanced discovery and optimizations.

5G NR devices, networks, and systems may be implemented to use optimized OFDM-based waveform features. These features may include scalable numerology and transmission time intervals (TTIs); a common, flexible framework to efficiently multiplex services and features with a dynamic, low-latency time division duplex (TDD)/frequency division duplex (FDD) design; and advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs allows transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

For clarity, certain aspects of the apparatus and techniques may be described below with reference to example 5G NR implementations or in a 5G-centric way, and 5G terminology may be used as illustrative examples in portions of the description below; however, the description is not intended to be limited to 5G applications.

Moreover, it should be understood that, in operation, wireless communication networks adapted according to the concepts herein may operate with any combination of licensed or unlicensed spectrum depending on loading and availability. Accordingly, it will be apparent to a person having ordinary skill in the art that the systems, apparatus, and methods described herein may be applied to other communications systems and applications than the particular examples provided.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements, etc. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range from chip-level or modular components to non-chip-level implementations and further to aggregated, distributed, or OEM devices or systems incorporating one or more described aspects. In some practical settings, devices incorporating described aspects and features may also necessarily include additional components and features for implementation and practice of claimed and described embodiments. It is intended that innovations described herein may be practiced in a wide variety of implementations, including both large/small devices, chip-level components, multi-component systems (e.g. RF-chain, communication interface, processor), distributed arrangements, aggregated or dis-aggregated deployments, end-user devices, etc. of varying sizes, shapes, and constitution.

FIG. 1 is a block diagram illustrating details of an example wireless communication system. The wireless communication system may include wireless network 100. Wireless network 100 may, for example, include a 5G wireless network. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Wireless network 100 illustrated in FIG. 1 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used. In implementations of wireless network 100 herein, base stations 105 may be associated with a same operator or different operators (e.g., wireless network 100 may include a plurality of operator wireless networks). Additionally, in implementations of wireless network 100 herein, base station 105 may provide wireless communications using one or more of the same frequencies (e.g., one or more frequency bands in licensed spectrum, unlicensed spectrum, or a combination thereof) as a neighboring cell. In some examples, an individual base station 105 or UE 115 may be operated by more than one network operating entity. In some other examples, each base station 105 and UE 115 may be operated by a single network operating entity.

A base station may provide communication coverage for a macro cell or a small cell, such as a pico cell or a femto cell, and/or other types of cells. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station, or a home base station. In the example shown in FIG. 1, base stations 105*d* and 105*e* are regular macro base stations, while base stations 105*a*-105*c* are macro base stations enabled with one of 3 dimension (3D), full dimension (FD), or massive MIMO. Base stations 105*a*-105*c* take advantage of their higher dimension MIMO capabilities to exploit 3D beamforming in both elevation and azimuth beamforming to increase coverage and capacity. Base station 105*f* is a small cell base station which may be a home node or portable access point. A base station may support one or multiple (e.g., two, three, four, and the like) cells.

Wireless network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. In some scenarios, networks may be enabled or configured to handle dynamic switching between synchronous or asynchronous operations.

UEs 115 are dispersed throughout the wireless network 100, and each UE may be stationary or mobile. It should be appreciated that, although a mobile apparatus is commonly referred to as user equipment (UE) in standards and specifications promulgated by the 3GPP, such apparatus may additionally or otherwise be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, a gaming device, an augmented reality device, vehicular component device/module, or some other suitable terminology. Within the present document, a "mobile" apparatus or UE need not necessarily have a capability to move, and may be stationary. Some non-limiting examples of a mobile apparatus, such as may include implementations of one or more of UEs 115, include a mobile, a cellular (cell) phone, a smart phone, a session initiation protocol (SIP) phone, a wireless local loop (WLL) station, a laptop, a personal computer (PC), a notebook, a netbook, a smart book, a tablet, and a personal digital assistant (PDA). A mobile apparatus may additionally be an "Internet of Things" (IoT) or "Internet of Everything" (IoE) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. In one aspect, a UE may be a device that includes a Universal Integrated Circuit Card (UICC). In another aspect, a UE may be a device that does not include a UICC. In some aspects, UEs that do not include UICCs may also be referred to as IoE devices. UEs 115*a*-115*d* of the implementation illustrated in FIG. 1 are examples of mobile smart phone-type devices accessing wireless network 100. A UE may also be a machine specifically configured for connected communication, including machine type communication (MTC), enhanced MTC (eMTC), narrowband IoT (NB-IoT) and the like. UEs 115*e*-115*k* illustrated in FIG. 1 are examples of various machines configured for communication that access wireless network 100.

A mobile apparatus, such as UEs 115, may be able to communicate with any type of the base stations, whether macro base stations, pico base stations, femto base stations, relays, and the like. In FIG. 1 a communication link (represented as a lightning bolt) indicates wireless transmissions between a UE and a serving base station, which is a base station designated to serve the UE on the downlink and/or uplink, or desired transmission between base stations, and backhaul transmissions between base stations. UEs may operate as base stations or other network nodes in some scenarios. Backhaul communication between base stations of wireless network 100 may occur using wired and/or wireless communication links.

In operation at wireless network 100, base stations 105*a*-105*c* serve UEs 115*a* and 115*b* using 3D beamforming and coordinated spatial techniques, such as coordinated multi-point (CoMP) or multi-connectivity. Macro base station 105*d* performs backhaul communications with base stations 105*a*-105*c*, as well as small cell, base station 105*f*. Macro base station 105*d* also transmits multicast services which are subscribed to and received by UEs 115*c* and 115*d*. Such multicast services may include mobile television or streaming video, or may include other services for providing community information, such as weather emergencies or alerts, such as Amber alerts or gray alerts.

Wireless network 100 of implementations supports mission critical communications with ultra-reliable and redundant links for mission critical devices, such UE 115*e*, which is a drone. Redundant communication links with UE 115*e* include from macro base stations 105*d* and 105*e*, as well as small cell base station 105*f*. Other machine type devices, such as UE 115*f* (thermometer), UE 115*g* (smart meter), and UE 115*h* (wearable device) may communicate through wireless network 100 either directly with base stations, such as small cell base station 105*f*, and macro base station 105*e*, or in multi-hop configurations by communicating with another user device which relays its information to the network, such as UE 115*f* communicating temperature measurement information to the smart meter, UE 115*g*, which is then reported to the network through small cell base station 105*f*. Wireless network 100 may also provide additional network efficiency through dynamic, low-latency TDD/FDD communications, such as in a vehicle-to-vehicle (V2V) mesh network between UEs 115*i*-115*k* communicating with macro base station 105*e*.

Figure 2:
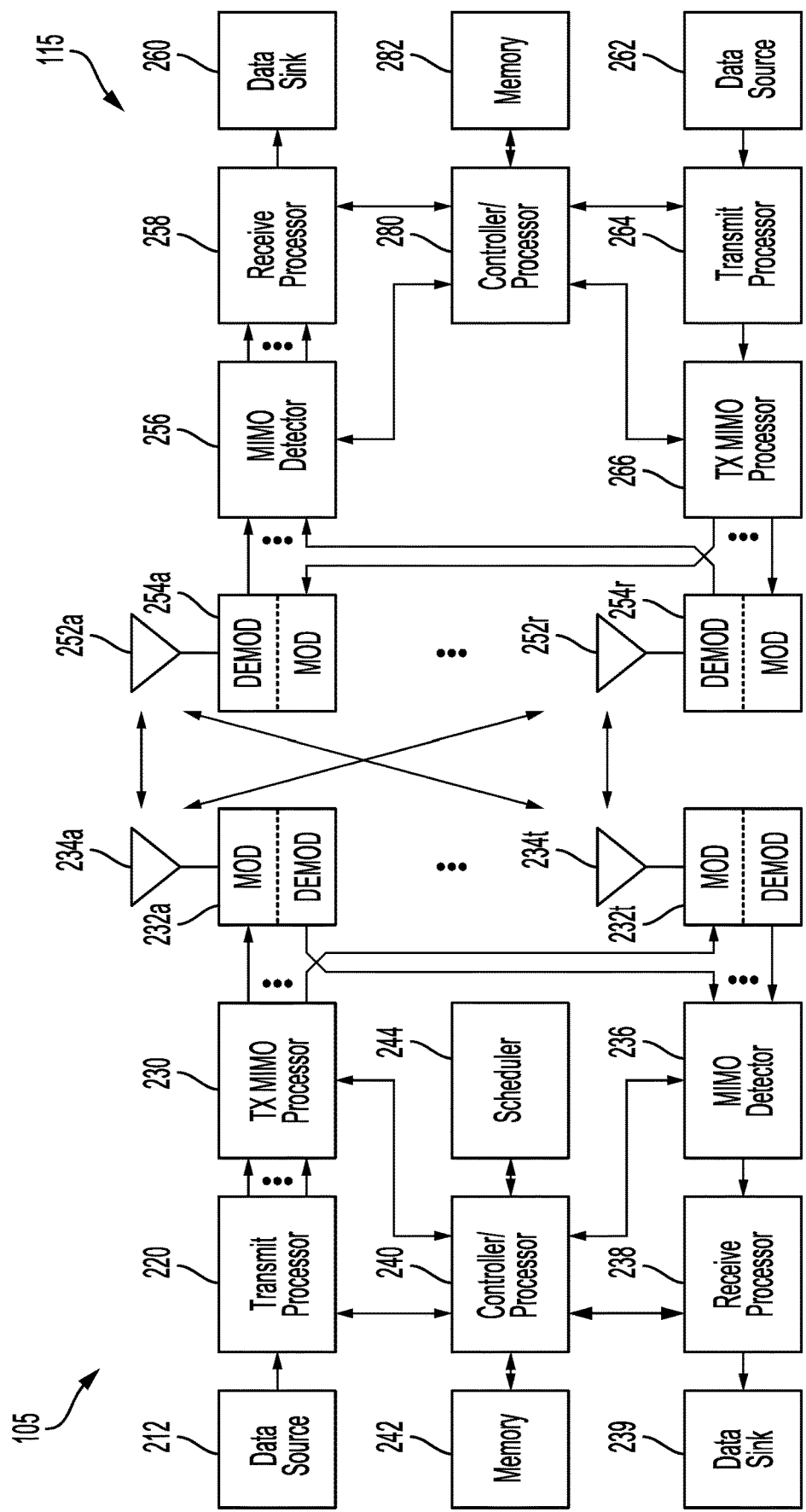
FIG. 2 is a block diagram conceptually illustrating a design of an example base station and an example user equipment (UE) configured according to some embodiments of the present disclosure.

FIG. 2 shows a block diagram conceptually illustrating an example design of a base station 105 and a UE 115, which may be any of the base stations and one of the UEs in FIG. 1. For a restricted association scenario (as mentioned above), base station 105 may be small cell base station 105*f* in FIG. 1, and UE 115 may be UE 115*c* or 115*d* operating in a service area of base station 105*f*, which in order to access small cell base station 105*f*, UE 115 would be included in a list of accessible UEs for small cell base station 105*f*. Base station 105 may also be a base station of some other type. As shown in FIG. 2, base station 105 may be equipped with antennas 234*a* through 234*t*, and UE 115 may be equipped with antennas 252*a* through 252*r* for facilitating wireless communications.

At base station 105, transmit processor 220 may receive data from data source 212 and control information from controller/processor 240. The control information may be for the physical broadcast channel (PBCH), physical control format indicator channel (PCFICH), physical hybrid-ARQ (automatic repeat request) indicator channel (PHICH), physical downlink control channel (PDCCH), enhanced physical downlink control channel (EPDCCH), MTC physical downlink control channel (MPDCCH), etc. The data may be for the PDSCH, etc. Additionally, transmit processor 220 may process (e.g., encode and symbol map) the data and control information to obtain data symbols and control symbols, respectively. Transmit processor 220 may also generate reference symbols (e.g., for the primary synchronization signal (PSS) and secondary synchronization signal (SSS), and cell-specific reference signal). Transmit (TX) multiple-input multiple-output (MIMO) processor 230 may perform spatial processing (e.g., precoding) on the data symbols, the control symbols, and/or the reference symbols, if applicable, and may provide output symbol streams to modulators (MODs) 232a through 232t. For example, spatial processing performed on the data symbols, the control symbols, or the reference symbols may include precoding. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232a through 232t may be transmitted via antennas 234a through 234t, respectively.

At UE 115, the antennas 252a through 252r may receive the downlink signals from base station 105 and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from demodulators 254a through 254r, perform MIMO detection on the received symbols, if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the physical uplink shared channel (PUSCH)) from data source 262 and control information (e.g., for the physical uplink control channel (PUCCH)) from controller/processor 280. Additionally, transmit processor 264 may also generate reference symbols for a reference signal. The symbols from transmit processor 264 may be precoded by TX MIMO processor 266, if applicable, further processed by modulators 254a through 254r (e.g., for SC-FDM, etc.), and transmitted to base station 105. At base station 105, the uplink signals from UE 115 may be received by antennas 234, processed by demodulators 232, detected by MIMO detector 236, if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at base station 105 and UE 115, respectively. Controller/processor 240 and/or other processors and modules at base station 105 and/or controller/processor 280 and/or other processors and modules at UE 115 may perform or direct the execution of various processes for the techniques described herein, such as to perform or direct the execution illustrated in FIGS. 11 and 12, and/or other processes for the techniques described herein. Memories 242 and 282 may store data and program codes for base station 105 and UE 115, respectively. Scheduler 244 may schedule UEs for data transmission on the downlink and/or uplink.

Wireless network 100 may support communication with one or more UEs 115 on multiple cells or carriers, a feature which may be referred to as carrier aggregation (CA) or multi-carrier operation. A UE 115 may, for example, be configured with multiple downlink component carriers and/or multiple uplink component carriers according to various carrier aggregation configurations. Carrier aggregation may be used with both FDD and TDD component carriers.

A carrier aggregation configuration may comprise non-contiguous component carriers (e.g., a non-contiguous carrier aggregation (NC-CA) configuration) in which two or more component carriers are separated from one another in the frequency-domain by a band of frequency. For example, non-contiguous component carriers may include a first component carrier of a first frequency band, such as a component carrier of NR Frequency Range 1 (FR1), and a second component carrier of a second frequency band, such as a component carrier of NR Frequency Range 2 (FR2), wherein a band of frequency separates the first and second component carriers. Additionally or alternatively, a carrier aggregation configuration may comprise contiguous component carriers (e.g., a contiguous carrier aggregation (C-CA) configuration) in which two or more component carriers are adjacent in the frequency-domain. For example, contiguous component carriers may include component carriers of a same frequency band, such as component carriers of FR1 or component carriers of FR2, wherein a first component carrier and a second component carrier comprise a contiguous band of frequency.

With carrier aggregation, the number of the component carriers for uplink and the number of the component carriers for downlink may be different. For example, wireless network 100 may use two component carriers for downlink while wireless network 100 may use only one component carrier for uplink. For FDD, the frequency bands of the downlink component carriers may be different from the frequency bands of the uplink component carriers. For TDD, the frequency bands of the downlink component carriers may be the same as or different from the frequency bands of the uplink component carriers.

Wireless device operations may be impacted by the particular electromagnetic signals processed by wireless devices. For example, transmit power and power amplifier (PA) efficiency may both be impacted at a wireless device (e.g., base station 105, UE 115, etc.) transmitting a signal. This may be due to peak to average power ratio (PAPR) characteristics of the waveforms employed. The PAPR of the signal waveform is peak amplitude squared (i.e., the peak power) divided by the RMS value squared (i.e., the average power). PAPR generally correlates to the quality of the waveform of a signal being processed for transmission and to the quality of the wireless device emissions.

An OFDM waveform, for example, suffers from relatively large PAPR (e.g., PAPR in the range of 10 dB). Cyclic prefix OFDM (CP-OFDM) waveforms in particular typically have high PAPR due to the random addition of subcarriers in the time-domain. PAPR with respect to OFDM signals grows rapidly by the size of the transport block. 5G NR aims for higher data-rates than LTE, resulting in the use of larger OFDM block-sizes, further increasing the PAPR. Even for low modulation coding scheme (MCS) transmissions that are not particularly demanding with respect to signal quality (e.g., do not need high error vector magnitude (EVM)), PA efficiency and transmit power are both limited by the resulting PAPR of the signal waveform.

Figure 3B:
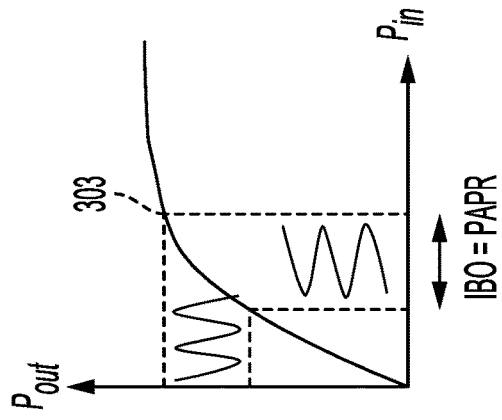
FIGS. 3B-3D are graphs illustrating the effects of various levels of input backoff (IBO) according to some aspects.
Figure 3D:
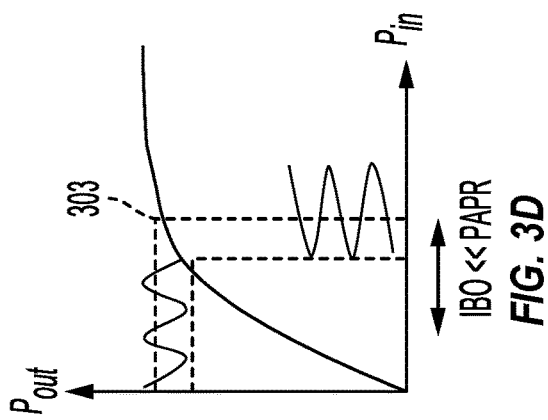
Figure 3A:
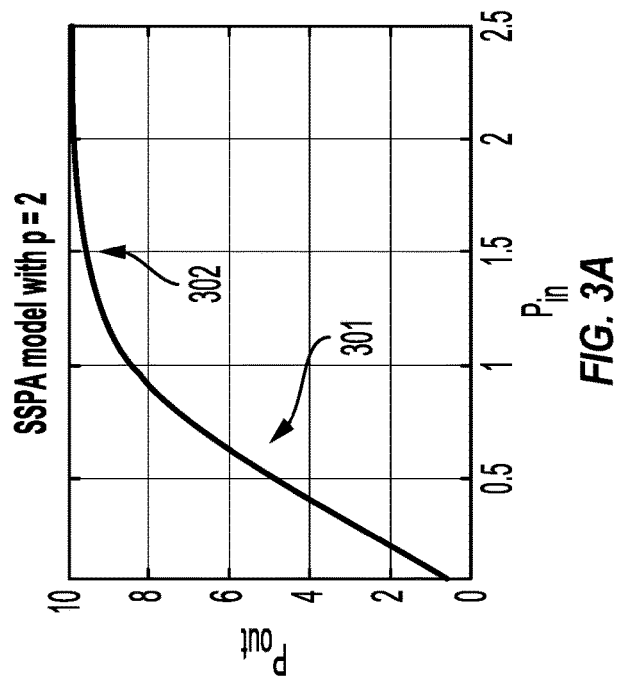
FIG. 3A is a graph showing a linear region and a non-liner region of an example solid state power amplifier according to some aspects.

A PA has a limited dynamic range, as represented by the power output (Pout) versus power input (Pin). The graph of FIG. 3A, showing linear region 301 and non-liner region 302 of an example solid state PA (SSPA), illustrates the limited dynamic range of the example PA. PAs generally exhibit non-linear behavior if operated at very high input power. If a PA is not operated in its linear region, the signal peaks may leak into the non-linear region of the PA causing in-band and out-of-band distortion of the signal, degraded EVM at the receivers, etc. For example, this signal distortion may introduce inter-modulation among the sub-carriers and out-of-band emission. Since OFDM signals have a high PAPR, OFDM signals in particular could be clipped in the transmitter PA, because of the limited dynamic range or non-linearity of the PA.

Figure 3C:
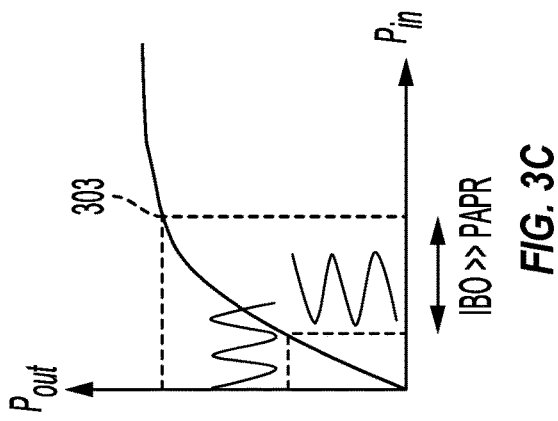

PA back-off may be utilized to prevent performance degradation and inter-modulation products leaking into adjacent channels. For example, to avoid the non-linearity, the PA may be operated at a mean input power that is several dB lower than the saturation point. If a signal has a PAPR of x dB, an input backoff (IBO) of x dB may be implemented to avoid the non-linearity even at the peak of the input signal. Implementation of IBO is illustrated in the graph of FIG. 3B in which, when IBO=PAPR, the peaks of the input signal power (Pin) and output signal power (Pout) remain at or below PA saturation point 303. Such PA back-off, however, may come at the cost of the degraded PA efficiency. As shown in the graph of FIG. 3C, when IPB<<PAPR, the peaks of the input signal power (Pin) and output signal power (Pout) remain appreciably below PA saturation point 303. This is an inefficient use of the PA (e.g., gain within the PA dynamic range remains unused). Insufficient PA backoff, however, results in the PA being driven into saturation and the associated signal distortion. For example, when IBO<<PAPR, the peaks of the input signal power (Pin) and output signal power (Pout) exceed PA saturation point 303 as shown in the graph of FIG. 3D.

Many existing PAPR reduction techniques are data-dependent and computationally expensive, making them unfit for a real-time implementation. As a result, clipping and filtering (CF) is most commonly used for PAPR reduction with respect to wireless communication networks. CF techniques eliminate the out-of-band radiation by clipping the time-domain signal to a predefined level and subsequently filtering it. CF, however, results in in-band distortion and is not guaranteed to converge to a desirable solution.

Compared to the previous generation of cellular networks, 4G-LTE and 5G NR provide an abundance of bandwidth both in the uplink and downlink. This is true both due to the addition of FR2 in 5G NR as well as increasing the available bandwidth to 100 MHz in the spectrum under 6 GHz (sub6) frequencies. This excess bandwidth is partially exploited by using longer OFDM symbols, which further increases the PAPR for OFDM. However, the excess bandwidth can also be exploited for PAPR reduction, such as using a PAPR reduction technique known as tone reservation.

Tone reservation is a signal processing technique for providing PAPR reduction in which a transmitter utilizes some of the otherwise-idle tones for reducing the PAPR. For example, in implementing tone reservation, given a set of data tones of a time-domain signal transmitted by a wireless device, a dedicated set of additional tones (referred to as peak reduction tones (PRTs)) orthogonal to the data tones are used by the wireless device to shape the time-domain signal. PRTs in time-domain may be designed to clip the peaky part of the original waveform so that the peak power is reduced at the cost of the increased average transmit power, if the EVM is maintained for the data tones. Using such PRTs, the EVM of the data tones can be protected without the receiver wireless device knowing exactly what is transmitted as the PRTs. Accordingly, the PRTs may include a set of additional tones having no relation to the data tones, whereby the receiver simply ignores the signal on the PRTs and only decodes the data tones. Given that there is no overlap between the data tones and PRTs, this tone reservation technique generally does not introduce any EVM or adjacent channel leakage power ratio (ACLR).

The effectiveness of tone reservation PAPR schemes depends on the number, location (e.g., frequency), magnitude (e.g., signal power), and phase (e.g., waveform relative displacement) of the PRT tones used with respect to a particular transmission signal. The carrier resources for the PRTs are taken from resources allocated for data transmission (e.g., allocated for transmission of user data, control data, etc., or combinations thereof) by the wireless device. Thus, the carrier resources available for the PRTs of a tone reservation PAPR scheme, and correspondingly the number of PRTs utilized with respect to any particular transmission signal, can be very limited. Computing optimized locations for PRT tones to be used with respect to data tones of a transmission signal is computationally expensive and challenging to implement in real-time, particularly by a UE having limited computing and power resource.

In accordance with aspects of the disclosure, one or more preconfigured or fixed index allocations for PRTs (e.g., providing PRT location sequences fixing the number and location of PRTs) may be provided for use in PAPR reduction with respect to various transmission signal waveforms of component carriers of carrier aggregation configurations. For example, an index allocation of PRTs of some embodiments may provide a universally good, although perhaps not optimized, PRT location sequence for PAPR reduction. In accordance with some aspects of the disclosure, a base station may select or otherwise designate one or more PRT location sequences to be utilized with respect to signals transmitted via carrier aggregation component carriers.

The magnitude and the phase of the PRTs of a PRT location sequence from an index allocation of PRTs may be adjusted for each symbol of a corresponding transmission signal when using the PRT location sequence for PAPR reduction in the transmission signal. For example, a transmitting device (e.g., UE 115 in an uplink or base station 105 in a downlink) implementing PAPR reduction with respect to component carriers of a carrier aggregation configuration may, for each component carrier, optimize the magnitude and the phase of the PRTs for a given OFDM symbol to minimize the PAPR of the OFDM waveform.

Fixing the locations (e.g., PRT frequencies) of the PRTs in advance (e.g., in a communication standard or communication protocol, by agreement or signaling between wireless devices, etc.) according to aspects of the present disclosure can significantly improve the complexity of a transmitter implementing a tone reservation PAPR scheme. For example, a transmitting device implementing PAPR reduction, such as a UE having limited computing and/or power resources, is relieved of a need to determine an appropriate or optimum PRT location sequence (e.g., determining the number and location of PRTs), and instead performs PRT magnitude (e.g., PRT signal power) and phase (e.g., PRT waveform relative displacement) optimization processing. That is, the PRT locations may be fixed (e.g., fixed in a communication standard, communication protocol, etc.) so there is no need for a transmitting device implementing PAPR reduction to perform optimization of the PRT locations in real-time, and instead may only perform optimization processing with respect to magnitude and phase of the PRTs in real-time for each OFDM symbol.

In an example, UE 115 may have been granted 2 resource blocks (RBs) equaling 24 tones for transmission via a particular component carrier, and is to use half of the available tones as PRTs for PAPR reduction with respect to a signal to be transmitted by the UE. In accordance with a typical tone reservation scheme, the UE may choose any subset of the 24 available tones for use as PRTs as long as the base station is made aware of this choice (e.g., through signaling). In accordance with some aspects of the disclosure, UE 115 may use a predefined PRT location sequence configuration (e.g., selected or otherwise designated by base station 105 and identifying a number of PRTs and their location within the allocated RBs) in identifying a subset of available tones for use as PRTs. The PRTs may be processed by UE 115 with data tones for generating a waveform for signal transmission via a carrier aggregation component carrier.

Figure 4:
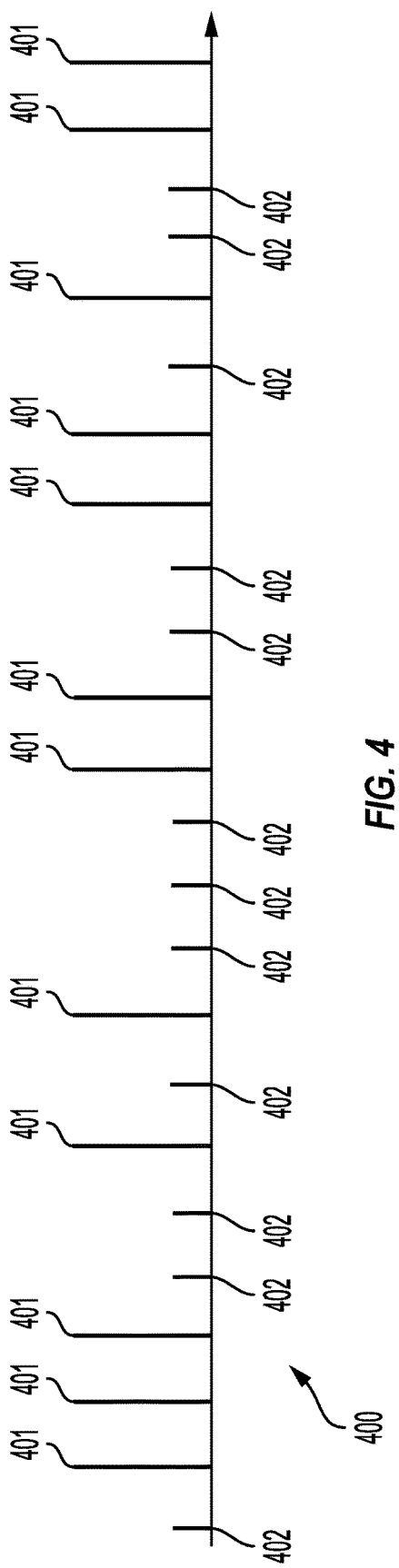
FIG. 4 is an example of peak reduction tones (PRTs) provided with respect to data tones for peak to average power ratio (PAPR) reduction operation according to some embodiments of the present disclosure.

FIG. 4 shows example signal 400 in the frequency-domain wherein 12 data tones (shown as data tones 401) are provided with a PRT location sequence of 12 tones (shown as PRTs 402) in a RB grant equaling 24 tones for PAPR reduction with respect to a transmission signal of a component carrier. In the illustrated example, the PRT location sequence provides a PRT inband location sequence configuration relative to the data tones in which PRTs are distributively located, interleaved with the data tones. UE 115 may, for example, generate the signal transmission waveform by taking the inverse fast Fourier transform (IFFT) of signal 400 including data tones 401 and PRTs 402.

Having the number of PRTs and their locations predetermined, such as through the use of one or more fixed index allocations for PRTs providing PRT location sequences, a transmitting device implementing PAPR reduction according to some aspects of the disclosure may perform PRT magnitude and phase optimization processing using various techniques. For example, a signal to clipping noise ratio, tone reservation (SCR-TR) algorithm may be utilized to optimize PRTs (e.g., phase and magnitude) with respect to data tones of a transmission signal.

In an example implementation of a SCR-TR algorithm for tone reservation, a transmitting device (e.g., UE 115) may be granted tones $\{1, \ldots, N\}$. A PRT location sequence may identify a subset ($\Phi$) of $\{1, \ldots, N\}$ corresponding to the PRT locations, wherein the data tones may comprise the remaining tones, $\{1, \ldots, N\}\backslash\Phi$. A frequency-domain kernel (P) for the location of the subset of PRTs ($\Phi$) of a PRT location sequence may be constructed as follows:

$$P_i = \begin{cases} 1 & \text{if } i \in \Phi \\ 0 & \text{if } i \in [N]\backslash\Phi \end{cases} \quad (1)$$

A time-domain kernel (p) for the subset of PRTs ($\Phi$) of the PRT location sequence may be constructed by taking the IFFT of the frequency-domain kernel (P), wherein p=ifft(P). In this example, the frequency-domain data may be represented by X, wherein $X_i$=0, if $i \in \Phi$. The time-domain data may be represented by x, wherein x=ifft(X).

The time-domain kernel (p) may be configured to approximate a delta function with negligible side-lobes by selecting a sufficiently large number of PRTs (e.g., a ratio of PRTs to data tones dependent various factors, such as 25% or the number of PRTs being approximately a quarter of the number of data tones in some examples) and properly choosing the PRT locations. Accordingly, PRT location sequences provided according to some aspects of the disclosure comprise PRTs in a number and having locations configured to produce a time-domain kernel (p) appropriately shaped for PAPR reduction.

Figure 5C:
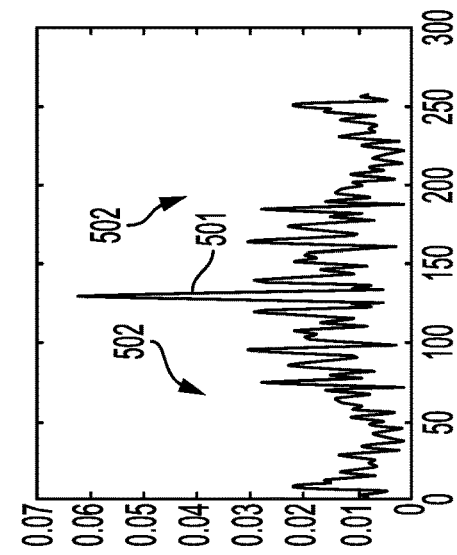
FIGS. 5A-5C are graphs showing shaping of a time-domain kernel (p) of an example signal to clipping noise ratio, tone reservation (SCR-TR) technique according to some embodiments of the present disclosure.
Figure 5B:
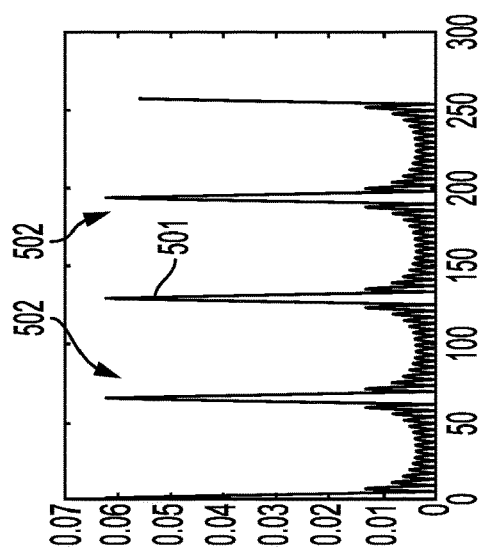
Figure 5A:
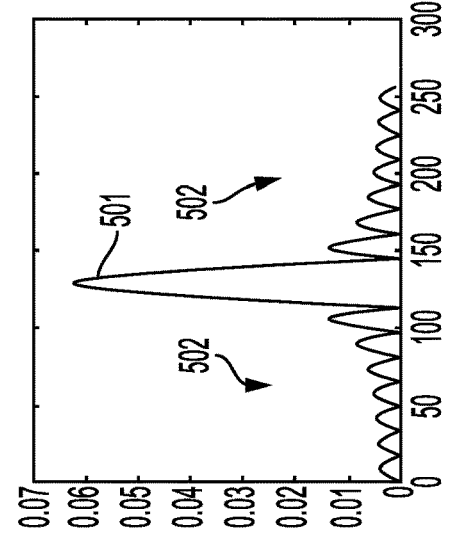

Examples with respect to shaping of a time-domain kernel (p) of a SCR-TR technique are shown in FIGS. 5A-5C. FIG. 5A shows a graph of a time-domain kernel for an example using contiguous PRTs. In the example of FIG. 5A, it can be seen that main-lobe 501 of the time-domain kernel is well defined, albeit somewhat wide, and side-lobes 502 are small in comparison to main-lobe 501. FIG. 5B shows a graph of a time-domain kernel for an example using a uniform comb pattern of PRTs. In the example of FIG. 5B, main-lobe 501 of the time-domain kernel is narrow but side-lobes 502 are very large in comparison to main-lobe 501. FIG. 5C shows a graph of a time-domain kernel for an example using a pseudo-random pattern of PRTs. In the example of FIG. 5C, main-lobe 501 of the time-domain kernel is narrow and side-lobes 502 are small in comparison to main-lobe 501.

PRT location sequences according to some aspects of the disclosure may utilize a pseudo-random pattern of PRTs, or other non-uniformly distributed pattern of PRTs (e.g., PRTs distributively located according to a Costas array, a Golomb ruler, etc.). Non-uniformly distributed patterns of PRTs may be utilized according to some examples for configuring the PRT location sequence (e.g., fixing the locations of the PRTs) to yield a sharp and narrow kernel in the time-domain for PRT magnitude and phase optimization processing, such as using a SCR-TR technique. For example, the random or non-uniform locations of the PRTs may be utilized to provide a reasonable trade-off between the width of the main-lobe and the magnitude of the side-lobes.

Additionally or alternatively, PRT location sequences according to some aspects of the disclosure may utilize a contiguous pattern of PRTs. Contiguous patterns of PRTs may be utilized according to some examples for configuring the PRT location sequence (e.g., fixing the locations of the PRTs) to yield a well-defined kernel in the time-domain for PRT magnitude and phase optimization processing, such as using a SCR-TR technique. For example, the contiguous locations of the PRTs may be utilized to provide a suitably large number of PRTs within a bandwidth of a component carrier for which the data tones are contiguous, for which PRTs are to be provided out-of-band with respect to the data tones, etc.

Figure 6:
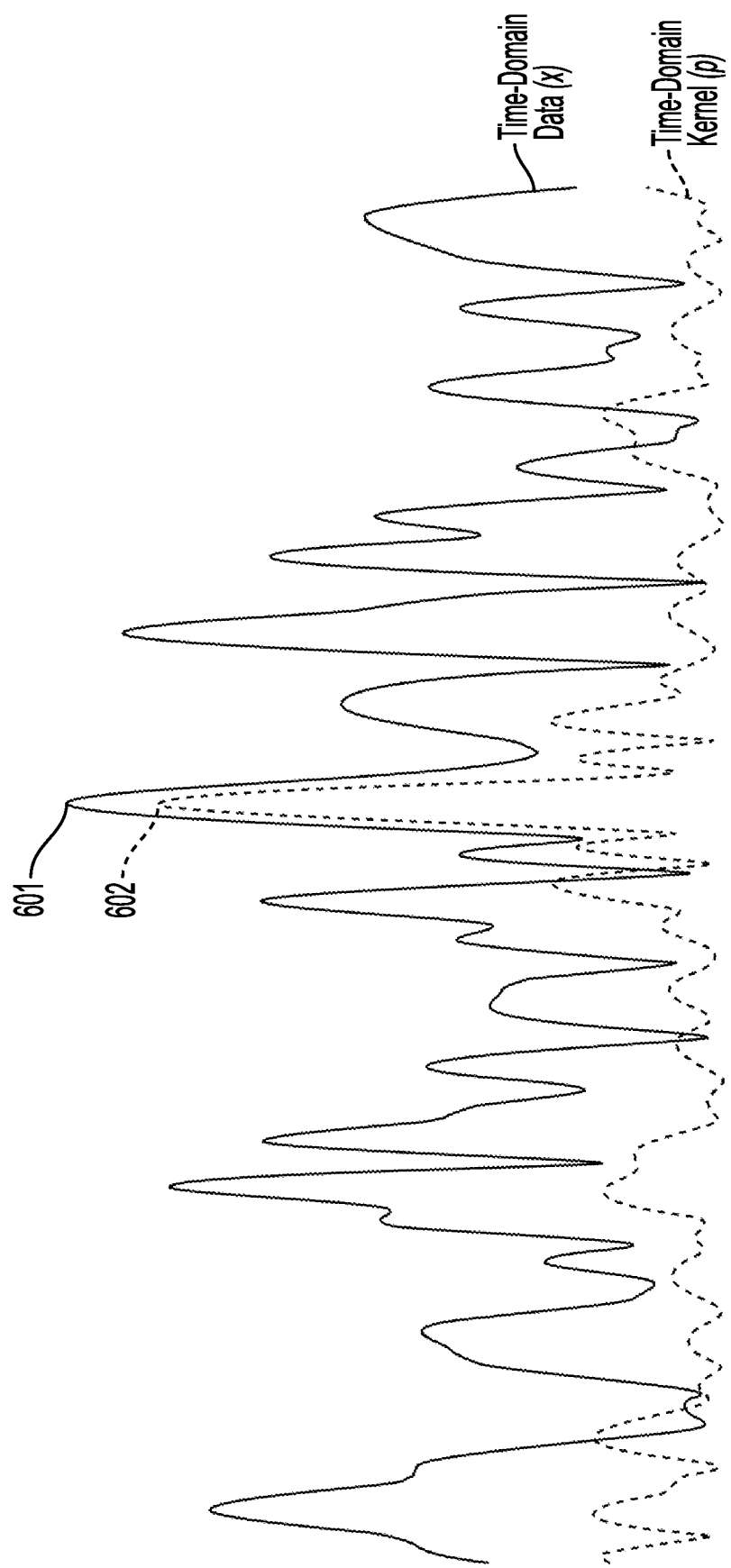
FIG. 6 is a graph showing a circularly shifting a time-domain kernel (p) for PRT magnitude and phase optimization processing using an example SCR-TR algorithm according to some embodiments of the present disclosure.

Circularly shifting the time-domain kernel (p) in the time-domain disturbs the phase of the PRTs in the frequency-domain, but does not impact the location of PRTs in the frequency-domain. Accordingly, circularly shifting of the time-domain kernel (p) may be utilized for PRT magnitude and phase optimization processing using a SCR-TR algorithm according to some aspects of the disclosure. For example, a SCR-TR algorithm implemented by PRT magnitude and phase optimization processing logic (e.g., logic of a transmitting device, such as UE 115, base station 105, etc.) may operate to find the location of the largest peak of the time-domain data (x) (e.g., peak 601 of time-domain data signal (x) shown in FIG. 6). The index of the location of this largest peak of the time-domain data may be represented as j∈[N]. Having located the largest peak of the time-domain data (x), the time-domain kernel (p) may be circularly shifted so that the peaks are aligned (e.g., peak 602 of time-domain kernel (p) aligned with peak 611, as shown in FIG. 6), wherein p'=circshift(p,j). The shifted time-domain kernel (p) may be scaled and subtracted from the time-domain data (x) to obtain new time-domain data ($x_{NEW}$) as follows:

$$x_{NEW} = x - \frac{|x(f)| - \mu}{p(0)} p^j e^{j<x(j)}, \quad (2)$$

where $\mu$ is the target peak, $<x(j)$ is the phase of $x(j)$ and $i=\sqrt{-1}$.

The foregoing SCR-TR algorithm may applied iteratively by PRT magnitude and phase optimization processing implemented according to some aspects of the disclosure. For example, the SCR-TR algorithm may be iterated several times, each with respect to a next largest peak of the time-domain data (x) to reduce several peaks.

Figure 7A:
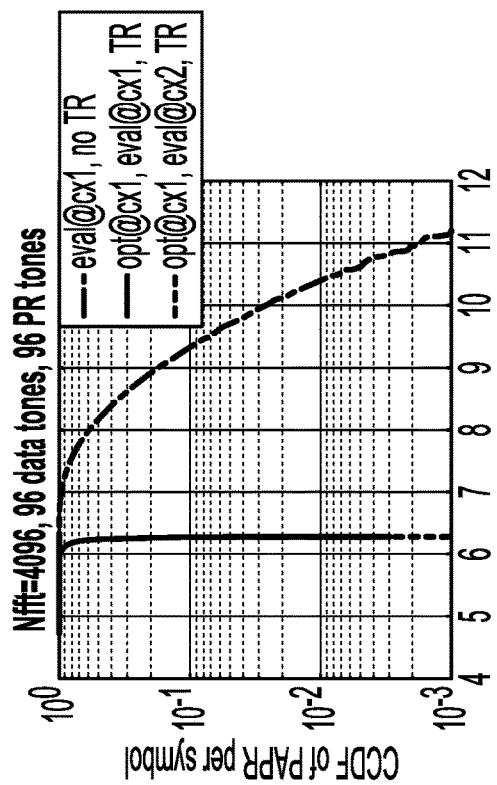
FIGS. 7A-7D are graphs illustrating PAPR reduction resulting from use of example PRT location sequences providing PRT magnitude and phase optimization processing using a SCR-TR algorithm according to some embodiments of the present disclosure.
Figure 7B:
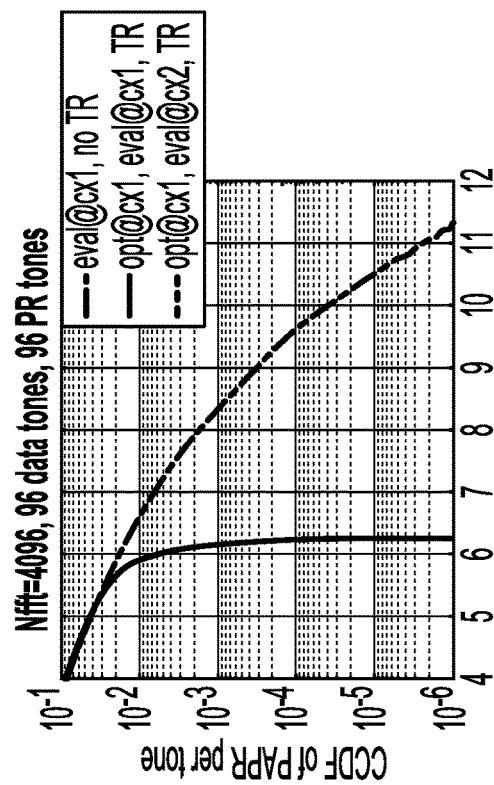
Figure 7C:
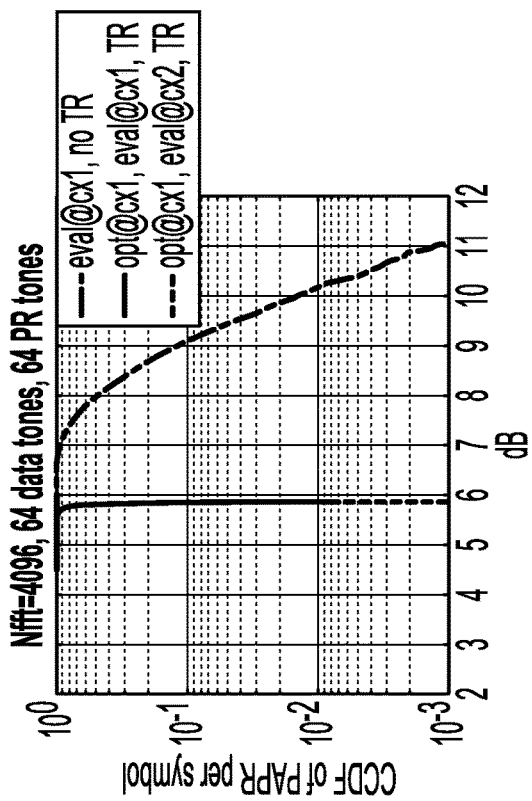
Figure 7D:
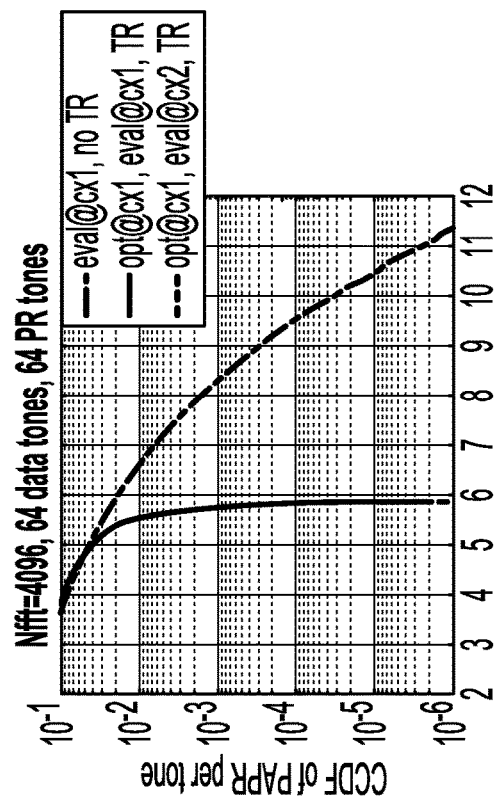

FIGS. 7A-7D illustrate PAPR reduction resulting from use of PRT location sequences providing PRT magnitude and phase optimization processing using a SCR-TR algorithm according to some aspects of the disclosure. In particular, FIGS. 7A and 7B show graphs representing PAPR reduction per symbol according to examples implementing PRT location sequences of embodiments with 64 data tones and a PRT location sequence of 64 tones (FIG. 7A) and with 96 data tones and a PRT location sequence of 96 tones (FIG. 7B). FIGS. 7C and 7D show graphs representing instantaneous PAPR reduction according to examples with 64 data tones and a PRT location sequence of 64 tones (FIG. 7C) and with 96 data tones and a PRT location sequence of 96 tones (FIG. 7D). It can be seen from the graphs of FIGS. 7A-7D that use of PRT location sequences provided PRT magnitude and phase optimization processing using a SCR-TR algorithm can provide PAPR reduction on the order of 5 dB.

Embodiments of the present disclosure provide PAPR reduction. Reduction in some scenarios can be with respect to signals of component carriers of a carrier aggregation configuration. Some deployments can use preconfigured or fixed PRT location sequences (e.g., fixing the number and location of PRTs), such as may be provided PRT magnitude and phase optimization processing using one or more techniques (e.g., implementing a SCR-TR algorithm). As discussed above, carrier aggregation configurations may comprise various carrier component arrangements, such as may include non-contiguous component carriers, contiguous component carriers, or a combination thereof, in one or more frequency bands. In accordance with some aspects of the present disclosure, PRT location sequences may be provided having PRT locations for use with respect to one or more such carrier aggregation configurations.

PRT location sequences having designated numbers of PRTs, PRT locations, etc. may be configured for use with respect to particular carrier aggregation configurations, component carrier data tone configurations, etc. For example, various PRT sideband location sequence configurations, PRT inband location sequence configurations, etc. may be configured to facilitate reduction of PAPR of a waveform corresponding to one or more carrier aggregation component carriers to satisfy a PAPR threshold (e.g., preconfigured maximum PAPR, PAPR lower than a saturation point of a power amplifier, etc.) when PRT magnitude and phase optimization processing using one or more techniques (e.g., implementing a SCR-TR algorithm) is implemented by a transmitting device using the PRT location sequence. FIGS. 8A-8C, 9A-9C, and 10A-10C, described below, show various PRT sideband location sequence configurations, PRT inband location sequence configurations, etc. that may be configured to facilitate reduction of PAPR according to some examples.

FIGS. 8A-8C show examples of inter-band carrier aggregation configurations. According to the inter-band carrier aggregation configurations of FIGS. 8A-8C, the frequency resources for a first component carrier (shown as CC1 bandwidth (BW)) are of a first predefined frequency range (shown as Band 1, such as may comprise FR1, FR2, etc.) and the frequency resources for a second component carrier (shown as CC2 BW) are of a second predefined frequency range (shown as Band 2, such as may comprise a different one of FR1, FR2, etc.). The inter-band component carriers of FIGS. 8A-8C show examples of non-contiguous component carriers (e.g., NC-CA configurations) in which the component carriers are separated in the frequency-domain by a band of frequency.

In inter-band carrier aggregation configuration 800a example of FIG. 8A, data tones 801a-1 are located within a sub-band of the first component carrier bandwidth (CC1 BW), and may comprise contiguously located data tones (e.g., data tones having contiguous frequencies), distributively located data tones (e.g., data tones having non-contiguous frequencies), or a combination thereof. Data tones 801a-2 are located within a sub-band of the second component carrier bandwidth (CC2 BW), and may comprise contiguously located data tones, distributively located data tones, or a combination thereof.

In the example of FIG. 8A, sideband (i.e., out-of-band with respect to the data tones) PRT location sequences are configured to provide PAPR reduction with respect to the component carriers of carrier aggregation configuration 800a. For example, PRT location sequence 802a-1 provided with respect to the first component carrier comprises a multi-sided PRT sideband location sequence configuration relative to data tones 801a-1 of the first component carrier. The PRTs of PRT location sequence 802a-1 may comprise contiguously located tones, distributively located tones, or a combination thereof. Similarly, PRT location sequence 802a-2 provided with respect to the second component carrier comprises a multi-sided PRT sideband location sequence configuration relative to data tones 801a-2 of the second component carrier. The PRTs of PRT location sequence 802a-2 may comprise contiguously located tones, distributively located tones, or a combination thereof. In accordance with some aspects of the disclosure, PRT location sequence 802a-1 and/or PRT location sequence 802a-2 may comprise contiguously located tones that are located contiguously with respect to a sub-band comprising data tones. The contiguously located tones of the PRT location sequences of some examples may facilitate a large number of PRTs included in the PRT location sequence, a time-domain kernel providing a well-defined main-lobe and small side-lobes, etc.

Multi-sided PRT sideband location sequence configurations as represented by the example of FIG. 8A may, for example, be particularly well suited for use with respect to component carriers in which the sub-band comprising the data tones are located away from either edge of the component carrier bandwidth. Nevertheless, single-sided PRT sideband location sequence configurations (e.g., as represented by the example of FIG. 8B) and/or PRT inband location sequence configurations (e.g., as represented by the example of FIG. 8C) may be used with respect to component carriers in which the sub-band comprising the data tones are located away from either edge of the component carrier bandwidth, in addition to or in the alternative to use of a multi-sided PRT sideband location sequence configuration.

In inter-band carrier aggregation configuration 800*b* example of FIG. 8B, data tones 801*b*-1 are located within a sub-band of the first component carrier bandwidth (CC1 BW), and may comprise contiguously located data tones, distributively located data tones, or a combination thereof. Data tones 801*b*-2 are located within a sub-band of the second component carrier bandwidth (CC2 BW), and may comprise contiguously located data tones, distributively located data tones, or a combination thereof.

As with the example above, sideband PRT location sequences of FIG. 8B are configured to provide PAPR reduction with respect to the component carriers of carrier aggregation configuration 800*b* in this example. For example, PRT location sequence 802*b*-1 provided with respect to the first component carrier comprises a single-sided PRT sideband location sequence configuration relative to data tones 801*b*-1 of the first component carrier. The PRTs of PRT location sequence 802*b*-1 may comprise contiguously located tones, distributively located tones, or a combination thereof. Similarly, PRT location sequence 802*b*-2 provided with respect to the second component carrier comprises a single-sided PRT sideband location sequence configuration relative to data tones 801*b*-2 of the second component carrier. The PRTs of PRT location sequence 802*b*-2 may comprise contiguously located tones, distributively located tones, or a combination thereof. In accordance with some aspects of the disclosure, PRT location sequence 802*b*-1 and/or PRT location sequence 802*b*-2 may comprise contiguously located tones that are located contiguously with respect to a sub-band comprising data tones. The contiguously located tones of the PRT location sequences of some examples may facilitate a large number of PRTs included in the PRT location sequence, a time-domain kernel providing a well-defined main-lobe and small side-lobes, etc.

Single-sided PRT sideband location sequence configurations as represented by the example of FIG. 8B may, for example, be particularly well suited for use with respect to component carriers in which the sub-band comprising the data tones are located at an edge of the component carrier bandwidth. Nevertheless, PRT inband location sequence configurations as represented by the example of FIG. 8C may be used with respect to component carriers in which the sub-band comprising the data tones are located away from either edge of the component carrier bandwidth, in addition to or in the alternative to use of a single-sided PRT sideband location sequence configuration.

In inter-band carrier aggregation configuration 800*c* example of FIG. 8C, data tones 801*c*-1 are located throughout the first component carrier bandwidth (CC1 BW), and may comprise distributively located data tones or a combination of distributively located data tones and contiguously located data tones. Data tones 801*c*-2 are located throughout the second component carrier bandwidth (CC2 BW), and may comprise distributively located data tones or a combination of distributively located data tones and contiguously located data tones.

In the example of FIG. 8C, inband (i.e., inband with respect to the data tones) PRT location sequences are configured to provide PAPR reduction with respect to the component carriers of carrier aggregation configuration 800*c*. For example, PRT location sequence 802*c*-1 provided with respect to the first component carrier comprises a distributed PRT inband location sequence configuration relative to data tones 801*c*-1 of the first component carrier. The PRTs of PRT location sequence 802*c*-1 may comprise contiguously located tones, distributively located tones, or a combination thereof interleaved with the data tones. Similarly, PRT location sequence 802*c*-2 provided with respect to the second component carrier may comprise a distributed PRT inband location sequence configuration relative to data tones 801*c*-2 of the second component carrier. The PRTs of PRT location sequence 802*c*-2 may comprise contiguously located tones, distributively located tones, or a combination thereof interleaved with the data tones. In accordance with some aspects of the disclosure, PRT location sequence 802*c*-1 and/or PRT location sequence 802*c*-2 may comprise distributively located tones that are located distributively with respect to a band comprising data tones. The distributively located tones of the PRT location sequences of some examples may facilitate a large number of PRTs included in the PRT location sequence, a time-domain kernel providing a narrow, well-defined main-lobe and small side-lobes, etc.

PRT inband location sequence configurations as represented by the example of FIG. 8C may, for example, be particularly well suited for use with respect to component carriers in which the band comprising the data tones spans the component carrier bandwidth edge to edge.

The PRT location sequences provided with respect to inter-band carrier aggregation configurations according to aspects of the disclosure may be configured according to various aspects of particular implementations and/or may be better suited for use with respect to particular implementations of an inter-band carrier aggregation configuration. For example, in operation using some examples of an inter-band carrier aggregation configuration, different power amplifiers may be used for component carriers by a transmitting device (e.g., base station 105, UE 115, etc.) transmitting the carrier aggregation signals. Each such power amplifier will produce only a portion of the output power for the carrier aggregation transmission, and the input backoff will be larger relative to the saturation point of each power amplifier. Accordingly, PAPR is likely to be less of an issue in many instances where separate power amplifiers are used for the component carriers, resulting in fewer peak reduction tones being needed in a PRT location sequence implemented according to aspects of the present disclosure for PAPR reduction. However, in operation using some examples of an inter-band carrier aggregation configuration, a same power amplifier may be used for component carriers by a transmitting device transmitting the carrier aggregation signals. The power amplifier may, for example, produce all of the output power for the carrier aggregation transmission, and the input backoff will be smaller relative to the saturation point of the power amplifier. Accordingly, PAPR is likely to be more of an issue in instances where a same power amplifier is used for component carriers, resulting in more peak reduction tones being needed in a PRT location sequence implemented according to aspects of the present disclosure for PAPR reduction.

PRT location sequence configurations of the examples of FIGS. 8A, 8B, and 8C may be utilized with respect to various amplifier implementations described above. The choice of a particular PRT location sequence configuration may depend upon various other factors of the implementation. For example, the PRT sideband location sequence configuration of FIG. 8B may be well suited for situations of edge RB allocation where the excess bandwidth also serves as a buffer for ACLR. The PRT inband location sequence configuration of FIG. 8C may be well suited for situations of higher QAM, center RB allocation, although this configuration may not be particularly well suited for use with respect to DFT-s-OFDM. However, the PRT sideband location sequence configuration of FIG. 8B may be well suited for situations of lower QAM, center RB or DFT-s-OFDM.

Although the examples of FIGS. 8A-8C show a same PRT location sequence configuration implemented with respect to each component carrier of the inter-band carrier aggregation configurations illustrated, different PRT location sequence configurations may nevertheless be implemented for component carriers of an inter-band carrier aggregation configuration. For example, any combination of multi-sided PRT sideband location sequence configurations, single-sided PRT sideband location sequence configurations, and/or PRT inband location sequence configurations may be implemented according to aspects of the present disclosure (e.g., sideband (multi-sided or single-sided) for a first component carrier and inband for a second component carrier, multi-sided sideband for a first component carrier and single-sided sideband for a second component carrier, etc.). Further, a combination of PRT location sequence configurations, such as sideband and inband PRT location sequence configurations, may be utilized with respect to non-contiguous inter-band component carriers according to some aspects of the disclosure.

FIGS. 9A-9C show examples of intra-band carrier aggregation configurations. According to the intra-band carrier aggregation configurations of FIGS. 9A-9C, the frequency resources for a first component carrier (shown as CC1 BW) and the frequency resources for a second component carrier (shown as CC2 BW) are of a same predefined frequency range (shown as Band 1, such as may comprise one of FR1, FR2, etc.). The intra-band component carriers of FIGS. 9A-9C show examples of non-contiguous component carriers (e.g., NC-CA configurations) in which the component carriers are separated in the frequency-domain by a band of frequency.

In intra-band carrier aggregation configuration 900a example of FIG. 9A, data tones 901a-1 are located within a sub-band of the first component carrier bandwidth (CC1 BW), and may comprise contiguously located data tones, distributively located data tones, or a combination thereof. Data tones 901a-2 are located within a sub-band of the second component carrier bandwidth (CC2 BW), and may comprise contiguously located data tones, distributively located data tones, or a combination thereof.

In the example of FIG. 9A, sideband PRT location sequences are configured to provide PAPR reduction with respect to the component carriers of carrier aggregation configuration 900a. For example, PRT location sequence 902a-1 provided with respect to the first component carrier comprises a multi-sided PRT sideband location sequence configuration relative to data tones 901a-1 of the first component carrier. The PRTs of PRT location sequence 902a-1 may comprise contiguously located tones, distributively located tones, or a combination thereof. Similarly, PRT location sequence 902a-2 provided with respect to the second component carrier comprises a multi-sided PRT sideband location sequence configuration relative to data tones 901a-2 of the second component carrier. The PRTs of PRT location sequence 902a-2 may comprise contiguously located tones, distributively located tones, or a combination thereof. In accordance with some aspects of the disclosure, PRT location sequence 902a-1 and/or PRT location sequence 902a-2 may comprise contiguously located tones that are located contiguously with respect to a sub-band comprising data tones. The contiguously located tones of the PRT location sequences of some examples may facilitate a large number of PRTs included in the PRT location sequence, a time-domain kernel providing a well-defined main-lobe and small side-lobes, etc.

Multi-sided PRT sideband location sequence configurations as represented by the example of FIG. 9A may, for example, be particularly well suited for use with respect to component carriers in which the sub-band comprising the data tones are located away from either edge of the component carrier bandwidth. Nevertheless, single-sided PRT sideband location sequence configurations as represented by the example of FIG. 9B and/or PRT inband location sequence configurations as represented by the example of FIG. 9C may be used with respect to component carriers in which the sub-band comprising the data tones are located away from either edge of the component carrier bandwidth, in addition to or in the alternative to use of a multi-sided PRT sideband location sequence configuration.

In intra-band carrier aggregation configuration 900b example of FIG. 9B, data tones 901b-1 are located within a sub-band of the first component carrier bandwidth (CC1 BW), and may comprise contiguously located data tones, distributively located data tones, or a combination thereof. Data tones 901b-2 are located within a sub-band of the second component carrier bandwidth (CC2 BW), and may comprise contiguously located data tones, distributively located data tones, or a combination thereof.

As with the example above, sideband PRT location sequences of FIG. 9B are configured to provide PAPR reduction with respect to the component carriers of carrier aggregation configuration 900b in this example. For example, PRT location sequence 902b-1 provided with respect to the first component carrier comprises a single-sided PRT sideband location sequence configuration relative to data tones 901b-1 of the first component carrier. The PRTs of PRT location sequence 902b-1 may comprise contiguously located tones, distributively located tones, or a combination thereof. Similarly, PRT location sequence 902b-2 provided with respect to the second component carrier comprises a single-sided PRT sideband location sequence configuration relative to data tones 901b-2 of the second component carrier. The PRTs of PRT location sequence 902b-2 may comprise contiguously located tones, distributively located tones, or a combination thereof. In accordance with some aspects of the disclosure, PRT location sequence 902b-1 and/or PRT location sequence 902b-2 may comprise contiguously located tones that are located contiguously with respect to a sub-band comprising data tones. The contiguously located tones of the PRT location sequences of some examples may facilitate a large number of PRTs included in the PRT location sequence, a time-domain kernel providing a well-defined main-lobe and small side-lobes, etc.

Single-sided PRT sideband location sequence configurations as represented by the example of FIG. 9B may, for example, be particularly well suited for use with respect to component carriers in which the sub-band comprising the data tones are located at an edge of the component carrier bandwidth. Nevertheless, PRT inband location sequence configurations as represented by the example of FIG. 9C may be used with respect to component carriers in which the sub-band comprising the data tones are located away from either edge of the component carrier bandwidth, in addition to or in the alternative to use of a single-sided PRT sideband location sequence configuration.

In intra-band carrier aggregation configuration 900c example of FIG. 9C, data tones 901c-1 are located throughout the first component carrier bandwidth (CC1 BW), and may comprise distributively located data tones or a combination of distributively located data tones and contiguously located data tones. Data tones 901*c*-2 are located throughout the second component carrier bandwidth (CC2 BW), and may comprise distributively located data tones or a combination of distributively located data tones and contiguously located data tones.

In the example of FIG. 9C, inband PRT location sequences are configured to provide PAPR reduction with respect to the component carriers of carrier aggregation configuration 900*c*. For example, PRT location sequence 902*c*-1 provided with respect to the first component carrier comprises a distributed PRT inband location sequence configuration relative to data tones 901*c*-1 of the first component carrier. The PRTs of PRT location sequence 902*c*-1 may comprise contiguously located tones, distributively located tones, or a combination thereof interleaved with the data tones. Similarly, PRT location sequence 902*c*-2 provided with respect to the second component carrier comprises a distributed PRT inband location sequence configuration relative to data tones 901*c*-2 of the second component carrier. The PRTs of PRT location sequence 902*c*-2 may comprise contiguously located tones, distributively located tones, or a combination thereof interleaved with the data tones. In accordance with some aspects of the disclosure, PRT location sequence 902*c*-1 and/or PRT location sequence 902*c*-2 may comprise distributively located tones that are located distributively with respect to a band comprising data tones. The distributively located tones of the PRT location sequences of some examples may facilitate a large number of PRTs included in the PRT location sequence, a time-domain kernel providing a narrow, well-defined main-lobe and small side-lobes, etc.

PRT inband location sequence configurations as represented by the example of FIG. 9C may, for example, be particularly well suited for use with respect to component carriers in which the band comprising the data tones spans the component carrier bandwidth edge to edge.

The PRT location sequences provided with respect to intra-band non-contiguous carrier aggregation configurations according to aspects of the disclosure may be configured according to various aspects of particular implementations and/or may be better suited for use with respect to particular implementations of an intra-band carrier aggregation configuration. For example, in operation using some examples of an intra-band carrier aggregation configuration, different power amplifiers may be used for component carriers by a transmitting device (e.g., base station 105, UE 115, etc.) transmitting the carrier aggregation signals. As discussed above, PAPR is likely to be less of an issue in many instances where separate power amplifiers are used for the component carriers, resulting in fewer peak reduction tones being needed in a PRT location sequence implemented according to aspects of the present disclosure for PAPR reduction. However, in operation using some examples of an intra-band carrier aggregation configuration, a same power amplifier may be used for component carriers by a transmitting device transmitting the carrier aggregation signals. As discussed above, PAPR is likely to be more of an issue in instances of an intra-band carrier aggregation configuration where a same power amplifier is used for component carriers, resulting in more peak reduction tones being needed in a PRT location sequence implemented according to aspects of the present disclosure for PAPR reduction.

PRT location sequence configurations of the examples of FIGS. 9A, 9B, and 9C may be utilized with respect to various amplifier implementations described above. The choice of a particular PRT location sequence configuration may depend upon various other factors of the implementation. For example, the PRT sideband location sequence configuration of FIG. 9B may be well suited for situations of edge RB allocation where the excess bandwidth also serves as a buffer for ACLR. The PRT inband location sequence configuration of FIG. 9C may be well suited for situations of higher QAM, center RB allocation, although this configuration may not be particularly well suited for use with respect to DFT-s-OFDM. However, the PRT sideband location sequence configuration of FIG. 9B may be well suited for situations of lower QAM, center RB or DFT-s-OFDM.

Although the examples of FIGS. 9A-9C show a same PRT location sequence configuration implemented with respect to each component carrier of the intra-band carrier aggregation configurations illustrated, different PRT location sequence configurations may nevertheless be implemented for component carriers of an intra-band carrier aggregation configuration. For example, any combination of multi-sided PRT sideband location sequence configurations, single-sided PRT sideband location sequence configurations, and/or PRT inband location sequence configurations may be implemented according to aspects of the present disclosure (e.g., sideband (multi-sided or single-sided) for a first component carrier and inband for a second component carrier, multi-sided sideband for a first component carrier and single-sided sideband for a second component carrier, etc.). Further, a combination of PRT location sequence configurations, such as sideband and inband PRT location sequence configurations, may be utilized with respect to non-contiguous intra-band component carriers according to some aspects of the disclosure.

FIGS. 10A-10C show further examples of intra-band carrier aggregation configurations. According to the intra-band carrier aggregation configurations of FIGS. 10A-10C, the frequency resources for a first component carrier (shown as CC1 BW) and the frequency resources for a second component carrier (shown as CC2 BW) are of a same predefined frequency range (shown as Band 1, such as may comprise one of FR1, FR2, etc.). The intra-band component carriers of FIGS. 10A-10C show examples of contiguous component carriers (e.g., C-CA configurations) in which two or more component carriers are adjacent in the frequency-domain.

In intra-band carrier aggregation configuration 1000*a* example of FIG. 10A, data tones 1001*a*-1 are located within a sub-band of the first component carrier bandwidth (CC1 BW), and may comprise contiguously located data tones, distributively located data tones, or a combination thereof. Data tones 1001*a*-2 are located within a sub-band of the second component carrier bandwidth (CC2 BW), and may comprise contiguously located data tones, distributively located data tones, or a combination thereof.

In the example of FIG. 10A, sideband PRT location sequences are configured to provide PAPR reduction with respect to the component carriers of carrier aggregation configuration 1000*a*. For example, PRT location sequences 1002*a*-1 and 1002-2 comprise a multi-sided PRT sideband location sequence configuration relative to data tones 1001*a*-1 and data tones 1001*a*-2 of the contiguous first and second component carriers. The PRTs of PRT location sequences 1002*a*-1 and 1002*a*-2 may comprise contiguously located tones, distributively located tones, or a combination thereof. In accordance with some aspects of the disclosure, PRT location sequence 1002*a*-1 and/or PRT location sequence 1002*a*-2 may comprise contiguously located tones that are located contiguously with respect to a sub-band comprising data tones. The contiguously located tones of the PRT location sequences of some examples may facilitate a large number of PRTs included in the PRT location sequence, a time-domain kernel providing a well-defined main-lobe and small side-lobes, etc.

Multi-sided PRT sideband location sequence configurations as represented by the example of FIG. 10A may, for example, be particularly well suited for use with respect to contiguous component carriers in which the sub-bands comprising the data tones are located away from the outer edges of the component carrier bandwidth. Nevertheless, single-sided PRT sideband location sequence configurations as represented by the example of FIG. 10B and/or PRT inband location sequence configurations as represented by the example of FIG. 10C may be used with respect to contiguous component carriers in which the sub-band comprising the data tones are located away from the outer edges of the component carrier bandwidth.

In intra-band carrier aggregation configuration 1000*b* example of FIG. 10B, data tones 1001*b*-1 are located within a sub-band of the first component carrier bandwidth (CC1 BW), and may comprise contiguously located data tones, distributively located data tones, or a combination thereof. Data tones 1001*b*-2 are located within a sub-band of the second component carrier bandwidth (CC2 BW), and may comprise contiguously located data tones, distributively located data tones, or a combination thereof.

Similar to the example above, a sideband PRT location sequence of FIG. 10B is configured to provide PAPR reduction with respect to the component carriers of carrier aggregation configuration 1000*b* in this example. For example, PRT location sequence 1002*b*-1 is provided with respect to data tones 1001*b*-1 and data tones 1001*b*-2 of the contiguous first and second component carriers. The PRTs of the PRT location sequences may comprise contiguously located tones, distributively located tones, or a combination thereof. In accordance with some aspects of the disclosure, PRT location sequence 1002*b*-1 may comprise contiguously located tones that are located contiguously with respect to a sub-band comprising data tones. The contiguously located tones of the PRT location sequences of some examples may facilitate a large number of PRTs included in the PRT location sequence, a time-domain kernel providing a well-defined main-lobe and small side-lobes, etc.

Single-sided PRT sideband location sequence configurations as represented by the example of FIG. 10B may, for example, be particularly well suited for use with respect to the contiguous component carriers in which the sub-bands comprising the data tones are located at an outer edge of the component carrier bandwidth. Nevertheless, PRT inband location sequence configurations as represented by the example of FIG. 10C may be used with respect to contiguous component carriers in which the sub-band comprising the data tones are located at an outer edge of the component carrier bandwidth.

In intra-band carrier aggregation configuration 1000*c* example of FIG. 10C, data tones 1001*c*-1 are located throughout the first component carrier bandwidth (CC1 BW), and may comprise distributively located data tones or a combination of distributively located data tones and contiguously located data tones. Data tones 1001*c*-2 are located throughout the second component carrier bandwidth (CC2 BW), and may comprise distributively located data tones or a combination of distributively located data tones and contiguously located data tones.

In the example of FIG. 10C, inband PRT location sequences are configured to provide PAPR reduction with respect to the component carriers of carrier aggregation configuration 1000*c*. For example, PRT location sequence 1002*c*-1 provided with respect to the first component carrier comprises a distributed PRT inband location sequence configuration relative to data tones 1001*c*-1 of the first component carrier. The PRTs of PRT location sequence 1002*c*-1 may comprise contiguously located tones, distributively located tones, or a combination thereof interleaved with the data tones. Similarly, PRT location sequence 1002*c*-2 provided with respect to the second component carrier comprises a distributed PRT inband location sequence configuration relative to data tones 1001*c*-2 of the second component carrier. The PRTs of PRT location sequence 1002*c*-2 may comprise contiguously located tones, distributively located tones, or a combination thereof interleaved with the data tones. In accordance with some aspects of the disclosure, PRT location sequence 1002*c*-1 and/or PRT location sequence 1002*c*-2 may comprise distributively located tones that are located distributively with respect to a band comprising data tones. The distributively located tones of the PRT location sequences of some examples may facilitate a large number of PRTs included in the PRT location sequence, a time-domain kernel providing a narrow, well-defined main-lobe and small side-lobes, etc.

PRT inband location sequence configurations as represented by the example of FIG. 10C may, for example, be particularly well suited for use with respect to component carriers in which the band comprising the data tones spans the component carrier bandwidth edge to edge.

The PRT location sequences provided with respect to intra-band contiguous carrier aggregation configurations according to aspects of the disclosure may be configured according to various aspects of particular implementations and/or may be better suited for use with respect to particular implementations of an intra-band carrier aggregation configuration. For example, in operation using some examples of an intra-band carrier aggregation configuration, different power amplifiers may be used for component carriers by a transmitting device (e.g., base station 105, UE 115, etc.) transmitting the carrier aggregation signals. As discussed above, PAPR is likely to be less of an issue in many instances where separate power amplifiers are used for the component carriers, resulting in fewer peak reduction tones being needed in a PRT location sequence implemented according to aspects of the present disclosure for PAPR reduction. However, in operation using some examples of an intra-band carrier aggregation configuration, a same power amplifier may be used for component carriers by a transmitting device transmitting the carrier aggregation signals. As discussed above, PAPR is likely to be more of an issue in instances where a same power amplifier is used for component carriers, resulting in more peak reduction tones being needed in a PRT location sequence implemented according to aspects of the present disclosure for PAPR reduction.

PRT location sequence configurations of the examples of FIGS. 10A, 10B, and 10C may be utilized with respect to various amplifier implementations described above. The choice of a particular PRT location sequence configuration may depend upon various other factors of the implementation. For example, the PRT sideband location sequence configuration of FIG. 10B may be well suited for situations of edge RB allocation where the excess bandwidth also serves as a buffer for ACLR. The PRT inband location sequence configuration of FIG. 10C may be well suited for situations of higher QAM, center RB allocation, although this configuration may not be particularly well suited for use with respect to DFT-s-OFDM. However, the PRT sideband location sequence configuration of FIG. 10B may be well suited for situations of lower QAM, center RB or DFT-s-OFDM.

Although the examples of FIGS. 10A-10C show a same PRT location sequence configuration implemented with respect to each component carrier of the intra-band carrier aggregation configurations illustrated, different PRT location sequence configurations may nevertheless be implemented for component carriers of an intra-band carrier aggregation configuration. For example, combinations of PRT sideband location sequence configurations and PRT inband location sequence configurations may be implemented according to aspects of the present disclosure (e.g., sideband for a first component carrier and inband for a second component carrier, etc.). Further, a combination of PRT location sequence configurations, such as sideband and inband PRT location sequence configurations, may be utilized with respect to contiguous intra-band component carriers according to some aspects of the disclosure.

FIG. 11 shows flow 1100 for operation by a wireless communication device implementing aspects of a PAPR reduction technique using PRTs with respect to component carriers (CCs) of carrier aggregation configurations according to aspects of the disclosure. The functions of flow 1100 of the example shown in FIG. 11 may, for example, be performed by various wireless devices of wireless network 100 (e.g., one or more of base stations 105) for facilitating PAPR reduction with respect to carrier aggregation CCs.

At block 1101 of example flow 1100, resource allocation indicating data tones and PRTs with respect to each CC of a plurality of CCs may be transmitted. For example, a base station 105 serving a UE 115 of wireless network 100 may transmit (e.g., using transmit processor 220, TX MIMO processor 230, mods 232*a*-232*t*, and antennas 234*a*-234*t* operating under control of controller/processor 240) resource allocation indicating data tones and PRTs with respect to each CC of a plurality of CCs to the UE, such as using radio resource control (RRC) signaling, downlink control information (DCI) signaling, etc. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences.

In accordance with some aspects of the disclosure, PRT location sequences provide preconfigured or fixed index allocations for PRTs (e.g., sideband PRT location sequence configurations, inband PRT location sequence configurations, etc., each providing a respective fixed number and locations of PRTs) for use in PAPR reduction with respect to various transmission signal waveforms of component carriers of carrier aggregation configurations. The PRT location sequences may, for example, include a PRT location sequence having a plurality of contiguously located PRTs, a PRT location sequence having a plurality of distributively located PRTs, or both.

The transmitted resource allocation may include information specifying the number of PRTs, their locations, etc., according to some aspects of the disclosure. Wireless devices may, however, be preconfigured (e.g., when provisioned, when joining or accessing the wireless network, etc.) with PRT location sequences (e.g., a PRT location sequence database stored by wireless devices, such as base stations 105, UEs 115, etc. including information regarding number of PRTs, PRT locations, etc. for one or more PRT location sequences), wherein the transmitted resource allocation may include information (e.g., index, database record locator, etc.) identifying a PRT location sequence for the resource allocation. Such indexing or similar PRT location sequence identifying information may, for example, be used to reduce signaling between wireless devices (e.g., base station 105 and UE 115) implementing PAPR reduction with respect to carrier aggregation CCs according to some aspects of the disclosure.

In some examples, a PRT location sequence of the transmitted resource allocation may comprise a PRT sideband location sequence configuration. For example, a PRT location sequence may provide a multi-sided PRT sideband location sequence configuration relative to data tones of a carrier aggregation CC. As another example, a PRT location sequences may provide a single-sided PRT sideband location sequence configuration relative to data tones of a carrier aggregation CC.

In accordance with some aspects of the disclosure, the one or more PRT location sequences of the transmitted resource allocation may include a first PRT location sequence having a plurality of contiguously located PRTs. The contiguously located PRTs of the first PRT location sequence, may, for example, be located within the first bandwidth of a carrier aggregation first CC and may be configured such that PAPR of a waveform corresponding to the carrier aggregation first CC and of a waveform corresponding to the carrier aggregation second CC satisfies a PAPR threshold (e.g., meets one or more threshold values corresponding to a preconfigured maximum PAPR, a PAPR lower than a saturation point of a power amplifier, etc. when PRT magnitude and phase optimization processing is implemented by a transmitting device using the PRT location sequence).

The one or more PRT location sequences of the transmitted resource allocation may also include a second PRT location sequence having a plurality of contiguously located PRTs. The contiguously located PRTs of the first PRT location sequence may, for example, be located within the first bandwidth of a carrier aggregation first CC and may be configured such that PAPR of a waveform corresponding to the carrier aggregation first CC satisfies a PAPR threshold. The contiguously located PRTs of the second PRT location sequence may, for example, be located within the second bandwidth of the carrier aggregation second CC and may be configured such that PAPR of a waveform corresponding to the second CC satisfies the PAPR threshold. In another example, the contiguously located PRTs of the first PRT location sequence and the contiguously located PRTs of the second PRT location sequence may be located within the first bandwidth of a carrier aggregation first CC and may be configured such that PAPR of a waveform corresponding to the carrier aggregation first CC satisfies a PAPR threshold.

The one or more PRT location sequences of the transmitted resource allocation may further include a third PRT location sequence having a plurality of contiguously located PRTs and a fourth PRT location sequence having a plurality of contiguously located PRTs. The contiguously located PRTs of the first PRT location sequence and contiguously located PRTs of the second PRT location sequence may, for example, be located within the first bandwidth of a carrier aggregation first CC and may be configured such that PAPR of a waveform corresponding to the carrier aggregation first CC satisfies a PAPR threshold. The contiguously located PRTs of the third PRT location sequence and the contiguously located PRTs of the fourth PRT location sequence may, for example, be located within the second bandwidth of the carrier aggregation second CC and may be configured such that PAPR of a waveform corresponding to the carrier aggregation second CC satisfies the PAPR threshold.

In some examples, a PRT location sequence of the transmitted resource allocation may comprise a PRT inband location sequence configuration. For example, a PRT location sequence may provide a PRT inband location sequence configuration relative to data tones of a carrier aggregation first CC.

In accordance with some aspects of the disclosure, the one or more PRT location sequences of the transmitted resource allocation may include a first PRT location sequence having a plurality of distributively located PRTs. The distributively located PRTs of the first PRT location sequence may, for example, be located within the first bandwidth of a carrier aggregation first CC interleaved with data tones of the first CC and may be configured such that PAPR of a waveform corresponding to the first CC satisfies a PAPR threshold. In another example, the distributively located PRTs of the first PRT location sequence may be located within the first bandwidth of a carrier aggregation first CC interleaved with data tones of the first CC and within the second bandwidth of the carrier aggregation second CC interleaved with data tones of the second CC and may be configured such that PAPR of a waveform corresponding to the carrier aggregation first CC and of a waveform corresponding to the carrier aggregation second CC satisfies a PAPR threshold.

The one or more PRT location sequences of the transmitted resource allocation may also include a second PRT location sequence having a plurality of distributively located PRTs. The distributively located PRTs of the first PRT location sequence may, for example, be located within the first bandwidth of a carrier aggregation first CC interleaved with data tones of the carrier aggregation first CC and may be configured such that PAPR of a waveform corresponding to the carrier aggregation first CC satisfies a PAPR threshold. The distributively located PRTs of the second PRT location sequence may, for example, be located within the second bandwidth of the carrier aggregation second CC interleaved with data tones of the second CC and may be configured such that PAPR of a waveform corresponding to the carrier aggregation second CC satisfies the PAPR threshold.

The distributively located PRTs of a PRT sequence may be distributively located according to various techniques according to aspects of the present disclosure. For example, the distributively located PRTs may be distributively located according to a Costas array. As another example, the distributively located PRTs may be distributively located according to a Golomb ruler. In accordance with some aspects of the disclosure, the distributively located PRTs may be distributively located according to a pseudo-random distribution.

The PRT location sequences of the resource allocation transmitted at block 1101 of FIG. 11 may be configured and/or selected (e.g., by carrier aggregation PAPR reduction logic provided by an instruction set stored in memory 242 and executed by controller/processor 240 of base station 105) for use with respect to a carrier aggregation configuration implementing various carrier component arrangements (e.g., non-contiguous component carriers, contiguous component carriers, or a combination thereof, in one or more frequency bands). For example, the first bandwidth of a carrier aggregation first CC may be within a first frequency range predefined for the CA configuration and the second bandwidth of the carrier aggregation second CC may be within a second frequency range predefined for the CA configuration, wherein the first frequency range and the second frequency range are non-contiguous. In another example, the first bandwidth of a carrier aggregation first CC and the second bandwidth of the carrier aggregation second CC may be within a first frequency range predefined for the CA configuration, wherein a frequency range of the first bandwidth of the carrier aggregation first CC and a frequency range of the carrier aggregation second bandwidth of the second CC are non-contiguous or a frequency range of the first bandwidth of the carrier aggregation first CC and a frequency range of the second bandwidth of the carrier aggregation second CC are contiguous.

PRT location sequences may be provided having PRT locations for use with respect to one or more such carrier aggregation configurations. In accordance with some aspects of the present disclosure, the PRT location sequences of the resource allocation transmitted at block 1101 of flow 1100 may be configured and/or selected for a particular carrier aggregation configuration implemented by a wireless device (e.g., UE 115, base station 105, etc.) transmitting signals of the component carriers according to the carrier aggregation configuration.

At block 1102 of FIG. 11, a data transmission comprising one or more waveforms configured according to the resource allocation is received. For example, a base station 105 having transmitted resource allocation indicating one or more PRT location sequences to a UE 115 of wireless network 100 may receive (e.g., using antennas 234a-234t, DEMODs 232a-232t, MIMO detector 236, and receive processor 238 operating under control of controller/processor 240) a data transmission from the UE implementing PAPR reduction with respect to carrier aggregation component carrier signals using the one or more PRT location sequences.

FIG. 12 shows flow 1200 for operation by a wireless communication device implementing aspects of a PAPR reduction technique using PRTs with respect to CCs of carrier aggregation configurations according to aspects of the disclosure. The functions of flow 1200 of the example shown in FIG. 12 may, for example, be performed by various wireless devices of wireless network 100 transmitting signals of CCs according to a carrier aggregation configuration (e.g., one or more of UEs 115) for facilitating PAPR reduction with respect to the carrier aggregation CCs.

At block 1201 of example flow 1200, resource allocation indicating data tones and PRTs with respect to each CC of a plurality of CCs may be received. For example, a UE 115 being served by a base station 105 of wireless network 100 may receive (e.g., using antennas 252a-252r, DEMODs 254a-254r, MIMO detector 256, and receive processor 258 operating under control of controller/processor 280) resource allocation indicating data tones and PRTs with respect to each CC of a plurality of CCs from the base station, such as using RRC signaling, DCI signaling, etc. The resource allocation may indicate data tone locations within a first bandwidth of a first CC of the plurality of CCs and within a second bandwidth of a second CC of the plurality of CCs. Additionally or alternatively, the resource allocation may indicate PRT locations within at least one of the first bandwidth or the second bandwidth according to one or more PRT location sequences.

As described above, in accordance with some aspects of the disclosure, PRT location sequences provide preconfigured or fixed index allocations for PRTs (e.g., sideband PRT location sequence configurations, inband PRT location sequence configurations, etc., each providing a respective fixed number and locations of PRTs). PRT location sequences may be configured and/or selected for use with respect to a carrier aggregation configuration implementing various carrier component arrangements (e.g., non-contiguous component carriers, contiguous component carriers, or a combination thereof, in one or more frequency bands). Accordingly, the one or more PRT location sequences of the received resource allocation may be configured as described above with reference to flow 1100 of FIG. 11.

The received resource allocation may include information specifying the number of PRTs, their locations, etc., according to some aspects of the disclosure. As described above, however, wireless devices may be preconfigured with PRT location sequences (e.g., a PRT location sequence database stored by wireless devices, such as base stations 105, UEs 115, etc., including information regarding number of PRTs, PRT locations, etc. for one or more PRT location sequences). The received resource allocation may include information (e.g., index, database record locator, etc.) identifying a PRT location sequence for the resource allocation. A wireless device (e.g., UE 115) receiving the resource allocation may use such indexing or similar PRT location sequence identifying information to identify one or more PRT location sequences (e.g., select one or more PRT location sequences from a PRT location sequence database) to implement with respect to signals of carrier aggregation component carriers according to some aspects of the disclosure.

At block 1202 of FIG. 12, a data transmission comprising one or more waveforms configured according to the resource allocation is transmitted. For example, a UE 115 having received resource allocation indicating one or more PRT location sequences from a base station 105 of wireless network 100 may transmit (e.g., using transmit processor 264, TX MIMO processor 265, MODs 254a-254r, and antenna 252a-252r operating under control of controller/processor 280) a data transmission to the base station implementing PAPR reduction with respect to carrier aggregation component carrier signals using the one or more PRT location sequences.

In implementing PAPR reduction with respect to carrier aggregation component carrier signals using the one or more PRT location sequences, a transmitting device (e.g., UE 115) may perform PRT magnitude and phase optimization processing with respect to the PRTs of the one or more PRT location sequences using various techniques, such as using a SCR-TR algorithm. For example, logic of controller/processor 280 (e.g., carrier aggregation PAPR reduction logic provided by an instruction set stored in memory 282 and executed by controller/processor 280) may control transmit processor 264 to adjust the magnitude and the phase of the PRTs of a PRT location sequence for each symbol of a corresponding transmission signal of a component carrier, such as to satisfy a PAPR threshold (e.g., to meet one or more threshold values corresponding to a preconfigured maximum PAPR, a PAPR lower than a saturation point of a power amplifier, etc.).

Figure 13:
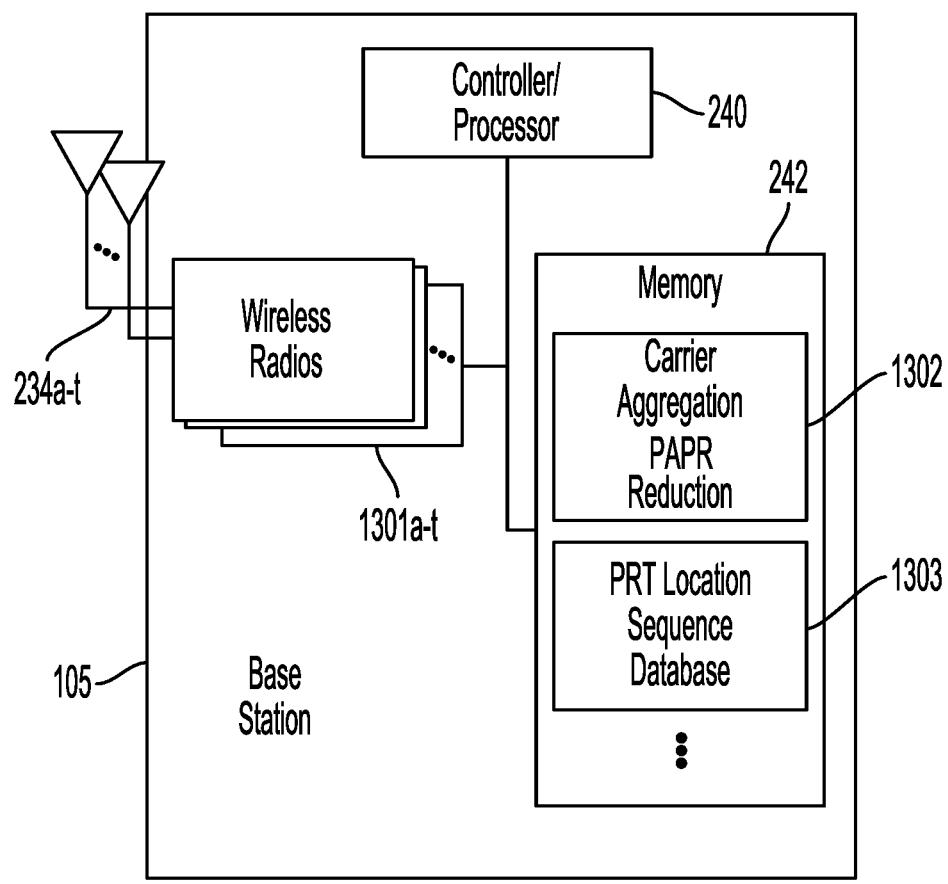
FIG. 13 is a block diagram conceptually illustrating an example design of a base station configured to facilitate carrier aggregation PAPR reduction operation according to some embodiments of the present disclosure.

FIG. 13 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1301a-t and antennas 234a-t. Wireless radios 1301a-t include various components and hardware, as illustrated in FIG. 2 for base station 105, including modulator/demodulators 232a-t, MIMO detector 236, receive processor 238, transmit processor 220, and TX MIMO processor 230.

One or more algorithms stored by the memory 242 configure controller/processor 240, transmit processor 220, and/or receive processor 238 to carry out one or more procedures relating to wireless communication by base station 105, as previously described. For example, PAPR reduction using PRTs of various PRT location sequences may be facilitated with respect to component carriers of carrier aggregation configurations using carrier aggregation PAPR reduction logic 1302 and/or PRT location sequence database 1303. In accordance with some aspects of the disclosure, carrier aggregation PAPR reduction logic 1302 may operate to configure and/or select one or more PRT location sequences of PRT location sequence database 1303 for use with respect to a carrier aggregation configuration to be implemented by a wireless device of wireless network 100. Carrier aggregation PAPR reduction logic 1302 may transmit resource allocation indicating the one or more PRT location sequences, such as to a UE 115 being served by the base station, as described above with respect to FIG. 11. PRT location sequence database 1303 may store one or more PRT location sequences (e.g., one or more PRT location sequences including information regarding number of PRTs, PRT locations, etc.), such as may be indexed or otherwise designated for identification (e.g., using an index, database record locator, etc.). Carrier aggregation PAPR reduction logic 1302 of aspects of the disclosure may control receiving, by the base station, a data transmission comprising one or more waveforms having PAPR reduction based at least in part on the one or more PRT location sequence of the resource allocation.

Figure 14:
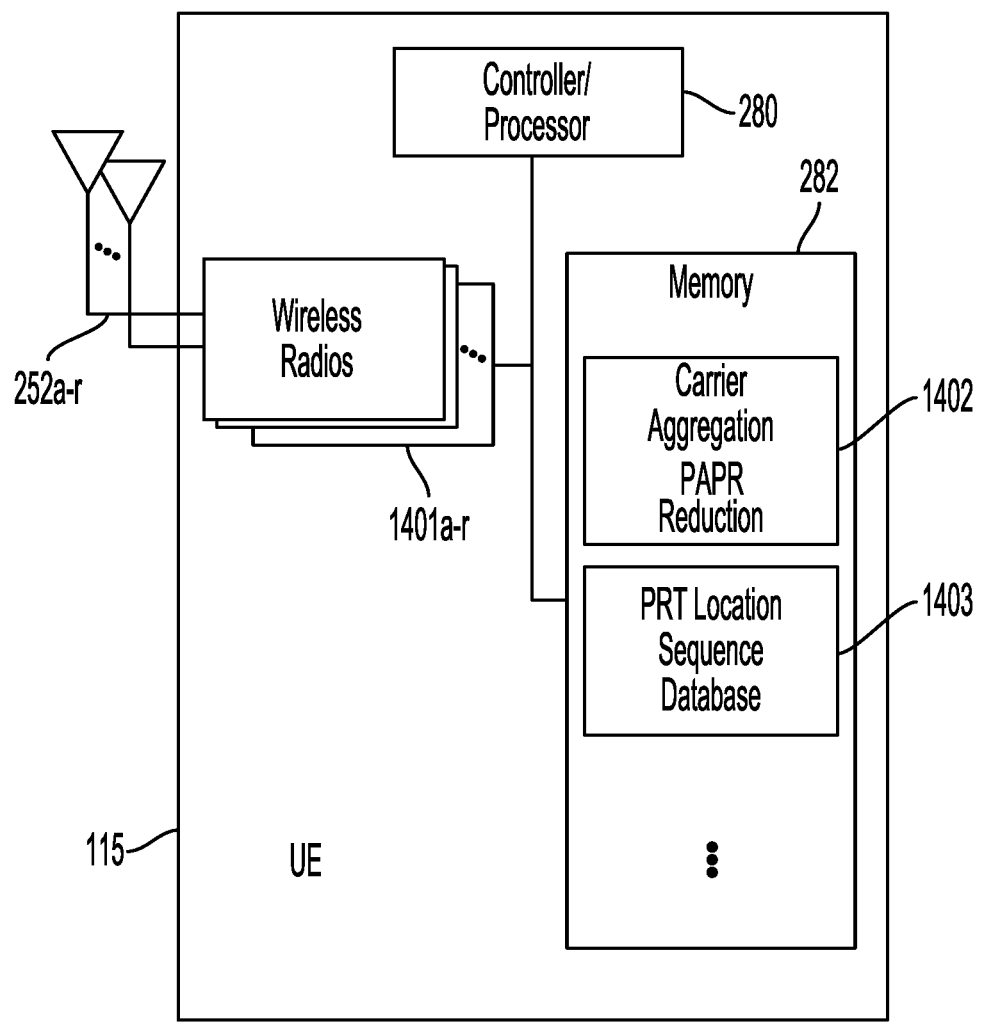
FIG. 14 is a block diagram conceptually illustrating an example design of a user equipment (UE) configured to facilitate carrier aggregation PAPR reduction operation according to some embodiments of the present disclosure.

FIG. 14 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 1401a-r and antennas 252a-r. Wireless radios 1401a-r include various components and hardware, as illustrated in FIG. 2 for UE 115, including modulator/demodulators 254a-r, MIMO detector 256, receive processor 258, transmit processor 264, and TX MIMO processor 266.

One or more algorithms stored by the memory 282 configure controller/processor 280, transmit processor 264, and/or receive processor 258 to carry out one or more procedures relating to wireless communication by UE 115, as previously described. For example, PAPR reduction using PRTs of various PRT location sequences may be facilitated with respect to component carriers of carrier aggregation configurations using carrier aggregation PAPR reduction logic 1402 and/or PRT location sequence database 1403. In accordance with some aspects of the disclosure, carrier aggregation PAPR reduction logic 1402 may operate to use one or more PRT location sequences of PRT location sequence database 1403 identified by resource allocation received by the UE for use with respect to a carrier aggregation configuration. Carrier aggregation PAPR reduction logic 1402 may receive resource allocation indicating the one or more PRT location sequences, such as from a base station 105 serving the UE, as described above with respect to FIG. 12. PRT location sequence database 1403 may store one or more PRT location sequences (e.g., one or more PRT location sequences including information regarding number of PRTs, PRT locations, etc.), such as may be indexed or otherwise designated for identification (e.g., using an index, database record locator, etc.). Carrier aggregation PAPR reduction logic 1402 may retrieve one or more PRT location sequences from PRT location sequence database 1403 for implementing PAPR reduction with respect to component carriers of a carrier aggregation configuration. PRT magnitude and phase optimization processing, such as using a SCR-TR algorithm, may be implemented with respect to data tones of a transmission signal by or under control of carrier aggregation PAPR reduction logic 1402. Carrier aggregation PAPR reduction logic 1402 of aspects of the disclosure may control transmitting, by the UE, a data transmission comprising one or more waveforms having PAPR reduction based at least in part on the one or more PRT location sequence of the resource allocation.

In some examples of methods, the apparatuses, and articles including non-transitory computer-readable medium described herein, various aspects of multi-slot transport block techniques may be implemented according to a multiplicity of combinations consistent with concepts described herein. Non-limiting examples of combinations of some aspects of a multi-slot transport block technique are set forth in the example clauses below.

1. Methods, apparatuses, and articles for wireless communication may provide for receiving, by a UE, resource allocation indicating data tones and PRTs with respect to each CC of a plurality of CCs, wherein the resource allocation indicates data tone locations within a first bandwidth of a first CC of the plurality of CCs and within a second bandwidth of a second CC of the plurality of CCs, and wherein the resource allocation indicates PRT locations within at least one of the first bandwidth or the second bandwidth according to one or more PRT location sequences, and transmitting, by the UE, a data transmission comprising one or more waveforms configured according to the resource allocation.

2. The methods, apparatuses, and articles of clause 1, wherein the one or more PRT location sequences include a PRT location sequence of a plurality of contiguously located PRTs, a PRT location sequence of a plurality of distributively located PRTs, or both.

3. The methods, apparatuses, and articles of any of clauses 1-2, further providing for performing, by the UE, PRT magnitude and phase optimization processing with respect to the PRTs of the one or more PRT location sequences prior to the transmitting.

4. The methods, apparatuses, and articles of clause 3, further providing for using a SCR-TR algorithm for the PRT magnitude and phase optimization processing.

5. The methods, apparatuses, and articles of any of clauses 3-4, wherein the PRT magnitude and phase optimization processing facilitates reduction of PAPR of a waveform of the one or more waveforms corresponding to the first CC or the second CC satisfying a PAPR threshold.

6. The methods, apparatuses, and articles of any of clauses 1-5, wherein the one or more PRT location sequences provide a multi-sided PRT sideband location configuration relative to the data tones of the first CC.

7. The methods, apparatuses, and articles of any of clauses 1-5, wherein the one or more PRT location sequences provide a single-sided PRT sideband location configuration relative to the data tones of the first CC.

8. The methods, apparatuses, and articles of any of clauses 1-5, wherein the one or more PRT location sequences provide a multi-sided PRT sideband location configuration relative to the data tones of the first CC and a single-sided PRT sideband location configuration relative to the data tones of the second CC.

9. The methods, apparatuses, and articles of any of clauses 1-8, wherein the one or more PRT location sequences include a first PRT location sequence of a plurality of contiguously located PRTs.

10. The methods, apparatuses, and articles of clause 9, wherein the contiguously located PRTs of the first PRT location sequence are located within the first bandwidth of the first CC and are configured such that PAPR of a waveform of the one or more waveforms corresponding to the first CC and of a waveform of the one or more waveforms corresponding to the second CC satisfies a PAPR threshold.

11. The methods, apparatuses, and articles of any of clauses 9-10, wherein the one or more PRT location sequences include a second PRT location sequence of a plurality of contiguously located PRTs.

12. The methods, apparatuses, and articles of clause 11, wherein the contiguously located PRTs of the first PRT location sequence are located within the first bandwidth of the first CC and are configured such that PAPR of a waveform of the one or more waveforms corresponding to the first CC satisfies a PAPR threshold, and wherein the contiguously located PRTs of the second PRT location sequence are located within the second bandwidth of the second CC and are configured such that PAPR of a waveform of the one or more waveforms corresponding to the second CC satisfies the PAPR threshold.

13. The methods, apparatuses, and articles of clause 11, wherein the contiguously located PRTs of the first PRT location sequence and the contiguously located PRTs of the second PRT location sequence are located within the first bandwidth of the first CC and are configured such that PAPR of a waveform of the one or more waveforms corresponding to the first CC satisfies a PAPR threshold.

14. The methods, apparatuses, and articles of any of clauses 11-13, wherein the one or more PRT location sequences include a third PRT location sequence of a plurality of contiguously located PRTs and a fourth PRT location sequence of a plurality of contiguously located PRTs.

15. The methods, apparatuses, and articles of any of clauses 14, wherein the contiguously located PRTs of the first PRT location sequence and contiguously located PRTs of the second PRT location sequence are located within the first bandwidth of the first CC and are configured such that PAPR of a waveform of the one or more waveforms corresponding to the first CC satisfies a PAPR threshold, and wherein the contiguously located PRTs of the third PRT location sequence and the contiguously located PRTs of the fourth PRT location sequence are located within the second bandwidth of the second CC and are configured such that PAPR of a waveform of the one or more waveforms corresponding to the second CC satisfies the PAPR threshold.

16. The methods, apparatuses, and articles of any of clauses 1-15, wherein the one or more PRT location sequences provide a PRT inband location configuration relative to the data tones of the first CC.

17. The methods, apparatuses, and articles of any of clauses 1-15, wherein the one or more PRT location sequences provide a PRT inband location configuration relative to the data tones of the first CC and a PRT sideband location configuration relative to the data tones of the second CC.

18. The methods, apparatuses, and articles of any of clauses 1-17, wherein the one or more PRT location sequences include a first PRT location sequence of a plurality of distributively located PRTs.

19. The methods, apparatuses, and articles of clause 18, wherein the distributively located PRTs of the first PRT location sequence are located within the first bandwidth of the first CC interleaved with the data tones of the first CC and are configured such that PAPR of a waveform of the one or more waveforms corresponding to the first CC satisfies a PAPR threshold.

20. The methods, apparatuses, and articles of clause 18, wherein the distributively located PRTs of the first PRT location sequence are located within the first bandwidth of the first CC interleaved with the data tones of the first CC and within the second bandwidth of the second CC interleaved with the data tones of the second CC and are configured such that PAPR of a waveform of the one or more waveforms corresponding to the first CC and of a waveform of the one or more waveforms corresponding to the second CC satisfies a PAPR threshold.

21. The methods, apparatuses, and articles of any of clauses 18-20, wherein the one or more PRT location sequences include a second PRT location sequence of a plurality of distributively located PRTs.

22. The methods, apparatuses, and articles of clause 21, wherein the distributively located PRTs of the first PRT location sequence are located within the first bandwidth of the first CC interleaved with the data tones of the first CC and are configured such that PAPR of a waveform of the one or more waveforms corresponding to the first CC satisfies a PAPR threshold, and wherein the distributively located PRTs of the second PRT location sequence are located within the second bandwidth of the second CC interleaved with the data tones of the second CC and are configured such that PAPR of a waveform of the one or more waveforms corresponding to the second CC satisfies the PAPR threshold.

23. The methods, apparatuses, and articles of any of clauses 18-22, wherein the distributively located PRTs are distributively located according to a Costas array.

24. The methods, apparatuses, and articles of any of clauses 18-22, wherein the distributively located PRTs are distributively located according to a Golomb ruler.

25. The methods, apparatuses, and articles of any of clauses 18-22, wherein the distributively located PRTs are distributively located according to a pseudo-random distribution.

26. The methods, apparatuses, and articles of any of clauses 1-25, wherein the first CC and the second CC are CCs of a CA configuration.

27. The methods, apparatuses, and articles of clause 26, wherein the first bandwidth of the first CC is within a first frequency range predefined for the CA configuration and the second bandwidth of the second CC is within a second frequency range predefined for the CA configuration, wherein the first frequency range and the second frequency range are non-contiguous.

28. The methods, apparatuses, and articles of clause 26, wherein the first bandwidth of the first CC and the second bandwidth of the second CC is within a first frequency range predefined for the CA configuration.

29. The methods, apparatuses, and articles of clause 28, wherein a frequency range of the first bandwidth of the first CC and a frequency range of the second bandwidth of the second CC are non-contiguous.

30. The methods, apparatuses, and articles of clause 28, wherein a frequency range of the first bandwidth of the first CC and a frequency range of the second bandwidth of the second CC are contiguous.

31. The methods, apparatuses, and articles of any of clauses 1-25, wherein the first CC and the second CC are CCs of an intra-band CA configuration, and wherein the first bandwidth of the first CC and the second bandwidth of the second CC are within a first frequency range predefined for the intra-band CA configuration.

32. The methods, apparatuses, and articles of any of clauses 1-25, wherein the first CC and the second CC are CCs of a CA configuration, and wherein a frequency range of the first bandwidth of the first CC and a frequency range of the second bandwidth of the second CC are contiguous.

33. Methods, apparatuses, and articles for wireless communication may provide for transmitting, by a base station, resource allocation indicating data tones and PRTs with respect to each CC of a plurality of CCs, wherein the resource allocation indicates data tone locations within a first bandwidth of a first CC of the plurality of CCs and within a second bandwidth of a second CC of the plurality of CCs, and wherein the resource allocation indicates PRT locations within at least one of the first bandwidth or the second bandwidth according to one or more PRT location sequences, and receiving, by the base station, a data transmission comprising one or more waveforms configured according to the resource allocation.

34. The methods, apparatuses, and articles of clause 33, wherein the one or more PRT location sequences include a PRT location sequence of a plurality of contiguously located PRTs, a PRT location sequence of a plurality of distributively located PRTs, or both.

35. The methods, apparatuses, and articles of any of clauses 33-34, wherein the one or more PRT location sequences provide a multi-sided PRT sideband location configuration relative to the data tones of the first CC.

36. The methods, apparatuses, and articles of any of clauses 33-34, wherein the one or more PRT location sequences provide a single-sided PRT sideband location configuration relative to the data tones of the first CC.

37. The methods, apparatuses, and articles of any of clauses 33-34, wherein the one or more PRT location sequences provide a multi-sided PRT sideband location configuration relative to the data tones of the first CC and a single-sided PRT sideband location configuration relative to the data tones of the second CC.

38. The methods, apparatuses, and articles of any of clauses 33-37, wherein the one or more PRT location sequences include a first PRT location sequence of a plurality of contiguously located PRTs.

39. The methods, apparatuses, and articles of clause 38, wherein the contiguously located PRTs of the first PRT location sequence are located within the first bandwidth of the first CC and are configured such that PAPR of a waveform of the one or more waveforms corresponding to the first CC and of a waveform of the one or more waveforms corresponding to the second CC satisfies a PAPR threshold.

40. The methods, apparatuses, and articles of any of clauses 38-39, wherein the one or more PRT location sequences include a second PRT location sequence of a plurality of contiguously located PRTs.

41. The methods, apparatuses, and articles of clause 40, wherein the contiguously located PRTs of the first PRT location sequence are located within the first bandwidth of the first CC and are configured such that PAPR of a waveform of the one or more waveforms corresponding to the first CC satisfies a PAPR threshold, and wherein the contiguously located PRTs of the second PRT location sequence are located within the second bandwidth of the second CC and are configured such that PAPR of a waveform of the one or more waveforms corresponding to the second CC satisfies the PAPR threshold.

42. The methods, apparatuses, and articles of clause 40, wherein the contiguously located PRTs of the first PRT location sequence and the contiguously located PRTs of the second PRT location sequence are located within the first bandwidth of the first CC and are configured such that PAPR of a waveform of the one or more waveforms corresponding to the first CC satisfies a PAPR threshold.

43. The methods, apparatuses, and articles of any of clauses 40-42, wherein the one or more PRT location sequences include a third PRT location sequence of a plurality of contiguously located PRTs and a fourth PRT location sequence of a plurality of contiguously located PRTs.

44. The methods, apparatuses, and articles of clause 43, wherein the contiguously located PRTs of the first PRT location sequence and contiguously located PRTs of the second PRT location sequence are located within the first bandwidth of the first CC and are configured such that PAPR of a waveform of the one or more waveforms corresponding to the first CC satisfies a PAPR threshold, and wherein the contiguously located PRTs of the third PRT location sequence and the contiguously located PRTs of the fourth PRT location sequence are located within the second bandwidth of the second CC and are configured such that PAPR of a waveform of the one or more waveforms corresponding to the second CC satisfies the PAPR threshold.

45. The methods, apparatuses, and articles of any of clauses 33-44, wherein the one or more PRT location sequences provide a PRT inband location configuration relative to the data tones of the first CC.

46. The methods, apparatuses, and articles of any of clauses 33-44, wherein the one or more PRT location sequences provide a PRT inband location configuration relative to the data tones of the first CC and a PRT sideband location configuration relative to the data tones of the second CC.

47. The methods, apparatuses, and articles of any of clauses 33-44, wherein the one or more PRT location sequences include a first PRT location sequence of a plurality of distributively located PRTs.

48. The methods, apparatuses, and articles of clause 47, wherein the distributively located PRTs of the first PRT location sequence are located within the first bandwidth of the first CC interleaved with the data tones of the first CC and are configured such that PAPR of a waveform of the one or more waveforms corresponding to the first CC satisfies a PAPR threshold.

49. The methods, apparatuses, and articles of clause 47, wherein the distributively located PRTs of the first PRT location sequence are located within the first bandwidth of the first CC interleaved with the data tones of the first CC and within the second bandwidth of the second CC interleaved with the data tones of the second CC and are configured such that PAPR of a waveform of the one or more waveforms corresponding to the first CC and of a waveform of the one or more waveforms corresponding to the second CC satisfies a PAPR threshold.

50. The methods, apparatuses, and articles of clause 47, wherein the one or more PRT location sequences include a second PRT location sequence of a plurality of distributively located PRTs.

51. The methods, apparatuses, and articles of clause 50, wherein the distributively located PRTs of the first PRT location sequence are located within the first bandwidth of the first CC interleaved with the data tones of the first CC and are configured such that PAPR of a waveform of the one or more waveforms corresponding to the first CC satisfies a PAPR threshold, and wherein the distributively located PRTs of the second PRT location sequence are located within the second bandwidth of the second CC interleaved with the data tones of the second CC and are configured such that PAPR of a waveform of the one or more waveforms corresponding to the second CC satisfies the PAPR threshold.

52. The methods, apparatuses, and articles of any of clauses 47-51, wherein the distributively located PRTs are distributively located according to a Costas array.

53. The methods, apparatuses, and articles of any of clauses 47-51, wherein the distributively located PRTs are distributively located according to a Golomb ruler.

54. The methods, apparatuses, and articles of any of clauses 47-51, wherein the distributively located PRTs are distributively located according to a pseudo-random distribution.

55. The methods, apparatuses, and articles of any of clauses 33-54, wherein the first CC and the second CC are CCs of a CA configuration.

56. The methods, apparatuses, and articles of clause 55, wherein the first bandwidth of the first CC is within a first frequency range predefined for the CA configuration and the second bandwidth of the second CC is within a second frequency range predefined for the CA configuration, wherein the first frequency range and the second frequency range are non-contiguous.

57. The methods, apparatuses, and articles of clause 55, wherein the first bandwidth of the first CC and the second bandwidth of the second CC is within a first frequency range predefined for the CA configuration.

58. The methods, apparatuses, and articles of clause 55, wherein a frequency range of the first bandwidth of the first CC and a frequency range of the second bandwidth of the second CC are non-contiguous.

59. The methods, apparatuses, and articles of clause 57, wherein a frequency range of the first bandwidth of the first CC and a frequency range of the second bandwidth of the second CC are contiguous.

60. The methods, apparatuses, and articles of any of clauses 33-54, wherein the first CC and the second CC are CCs of an intra-band CA configuration, and wherein the first bandwidth of the first CC and the second bandwidth of the second CC are within a first frequency range predefined for the intra-band CA configuration.

61. The methods, apparatuses, and articles of any of clauses 33-54, wherein the first CC and the second CC are CCs of a CA configuration, and wherein a frequency range of the first bandwidth of the first CC and a frequency range of the second bandwidth of the second CC are contiguous.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Components, the functional blocks, and modules described herein (e.g., the components, functional blocks, and modules in FIG. 2) may comprise processors, electronics devices, hardware devices, electronics components, logical circuits, memories, software codes, firmware codes, etc., or any combination thereof. In addition, features discussed herein relating to carrier aggregation PAPR reduction using PRT location sequences may be implemented via specialized processor circuitry, via executable instructions, and/or combinations thereof.

Those of skill would further appreciate that the various illustrative logical blocks, modules, circuits, and algorithm steps (e.g., the logical blocks in FIGS. 11 and 12) described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
   receiving, by a user equipment (UE), resource allocation indicating data tones and peak reduction tones (PRTs) with respect to each component carrier (CC) of a plurality of CCs, wherein the resource allocation indicates data tone locations within a first bandwidth of a first CC of the plurality of CCs and within a second bandwidth of a second CC of the plurality of CCs, and wherein the resource allocation indicates PRT locations within at least one of the first bandwidth or the second bandwidth according to one or more PRT location sequences; and
   transmitting, by the UE, a data transmission comprising one or more waveforms configured according to the resource allocation.

2. The method of claim 1, wherein the one or more PRT location sequences provide a PRT sideband location configuration relative to data tones of the first CC, the second CC, or both.

3. The method of claim 1, wherein the one or more PRT location sequences include a first PRT location sequence of a plurality of contiguously located PRTs, and wherein the contiguously located PRTs of the first PRT location sequence are located within the first bandwidth of the first CC and are configured such that peak to average power ratio (PAPR) of a waveform of the one or more waveforms corresponding to the first CC and of a waveform of the one or more waveforms corresponding to the second CC satisfies a PAPR threshold.

4. The method of claim 3, wherein the one or more PRT location sequences include a second PRT location sequence of a plurality of contiguously located PRTs.

5. The method of claim 4, wherein the contiguously located PRTs of the second PRT location sequence are located within the second bandwidth of the second CC and are configured such that PAPR of the waveform of the one or more waveforms corresponding to the second CC satisfies the PAPR threshold.

6. The method of claim 1, wherein the one or more PRT location sequences provide a PRT inband location configuration relative to data tones of the first CC.

7. The method of claim 1, wherein the one or more PRT location sequences include a first PRT location sequence of a plurality of distributively located PRTs, and wherein the distributively located PRTs of the first PRT location sequence include PRTs located within the first bandwidth of the first CC interleaved with data tones of the first CC and are configured such that peak to average power ratio (PAPR) of a waveform of the one or more waveforms corresponding to the first CC satisfies a PAPR threshold.

8. The method of claim 7, wherein the distributively located PRTs of the first PRT location sequence include PRTs located within the second bandwidth of the second CC interleaved with data tones of the second CC and are configured such that PAPR of the waveform of the one or more waveforms corresponding to the first CC and of a waveform of the one or more waveforms corresponding to the second CC satisfies a PAPR threshold.

9. The method of claim 7, wherein the one or more PRT location sequences include a second PRT location sequence of a plurality of distributively located PRTs, and wherein the distributively located PRTs of the second PRT location sequence are located within the second bandwidth of the second CC interleaved with data tones of the second CC and are configured such that PAPR of a waveform of the one or more waveforms corresponding to the second CC satisfies the PAPR threshold.

10. The method of claim 1, wherein the first CC and the second CC are CCs of an intra-band carrier aggregation (CA) configuration, and wherein the first bandwidth of the first CC and the second bandwidth of the second CC are within a first frequency range predefined for the intra-band CA configuration.

11. The method of claim 1, wherein the first CC and the second CC are CCs of a carrier aggregation (CA) configuration, and wherein a frequency range of the first bandwidth of the first CC and a frequency range of the second bandwidth of the second CC are contiguous.

12. An apparatus configured for wireless communication, the apparatus comprising:
a memory; and
at least one processor in electrical communication with the memory, wherein the at least one processor is configured to cause the apparatus to:
receive, by a user equipment (UE), resource allocation indicating data tones and peak reduction tones (PRTs) with respect to each component carrier (CC) of a plurality of CCs, wherein the resource allocation indicates data tone locations within a first bandwidth of a first CC of the plurality of CCs and within a second bandwidth of a second CC of the plurality of CCs, and wherein the resource allocation indicates PRT locations within at least one of the first bandwidth or the second bandwidth according to one or more PRT location sequences; and
transmit, by the UE, a data transmission comprising one or more waveforms configured according to the resource allocation.

13. The apparatus of claim 12, wherein the one or more PRT location sequences provide a PRT sideband location configuration relative to data tones of the first CC, the second CC, or both.

14. The apparatus of claim 12, wherein the one or more PRT location sequences include a first PRT location sequence of a plurality of contiguously located PRTs, and wherein the contiguously located PRTs of the first PRT location sequence are located within the first bandwidth of the first CC and are configured such that peak to average power ratio (PAPR) of a waveform of the one or more waveforms corresponding to the first CC and of a waveform of the one or more waveforms corresponding to the second CC satisfies a PAPR threshold.

15. The apparatus of claim 12, wherein the one or more PRT location sequences provide a PRT inband location configuration relative to data tones of the first CC, the second CC, or both.

16. The apparatus of claim 12, wherein the one or more PRT location sequences include a first PRT location sequence of a plurality of distributively located PRTs, and wherein the distributively located PRTs of the first PRT location sequence are located within the first bandwidth of the first CC interleaved with data tones of the first CC and are configured such that peak to average power ratio (PAPR) of a waveform of the one or more waveforms corresponding to the first CC satisfies a PAPR threshold.

17. The apparatus of claim 12, wherein the first CC and the second CC are CCs of an intra-band carrier aggregation (CA) configuration, and wherein the first bandwidth of the first CC and the second bandwidth of the second CC are within a first frequency range predefined for the intra-band CA configuration.

18. The apparatus of claim 12, wherein the first CC and the second CC are CCs of a carrier aggregation (CA) configuration, and wherein a frequency range of the first bandwidth of the first CC and a frequency range of the second bandwidth of the second CC are contiguous.

19. A method of wireless communication, comprising:
transmitting, by a base station, resource allocation indicating data tones and peak reduction tones (PRTs) with respect to each component carrier (CC) of a plurality of CCs, wherein the resource allocation indicates data tone locations within a first bandwidth of a first CC of the plurality of CCs and within a second bandwidth of a second CC of the plurality of CCs, and wherein the resource allocation indicates PRT locations within at least one of the first bandwidth or the second bandwidth according to one or more PRT location sequences; and receiving, by the base station, a data transmission comprising one or more waveforms configured according to the resource allocation.

20. The method of claim 19, wherein the one or more PRT location sequences provide a PRT sideband location configuration relative to data tones of the first CC, the second CC, or both.

21. The method of claim 19, wherein the one or more PRT location sequences include a first PRT location sequence of a plurality of contiguously located PRTs, and wherein the contiguously located PRTs of the first PRT location sequence are located within the first bandwidth of the first CC and are configured such that peak to average power ratio (PAPR) of a waveform of the one or more waveforms corresponding to the first CC and of a waveform of the one or more waveforms corresponding to the second CC satisfies a PAPR threshold.

22. The method of claim 21, wherein the one or more PRT location sequences include a second PRT location sequence of a plurality of contiguously located PRTs.

23. The method of claim 22, wherein the contiguously located PRTs of the second PRT location sequence are located within the second bandwidth of the second CC and are configured such that PAPR of the waveform of the one or more waveforms corresponding to the second CC satisfies the PAPR threshold.

24. The method of claim 19, wherein the one or more PRT location sequences provide a PRT inband location configuration relative to data tones of the first CC.

25. The method of claim 19, wherein the one or more PRT location sequences include a first PRT location sequence of a plurality of distributively located PRTs, and wherein the distributively located PRTs of the first PRT location sequence include PRTs located within the first bandwidth of the first CC interleaved with data tones of the first CC and are configured such that peak to average power ratio (PAPR) of a waveform of the one or more waveforms corresponding to the first CC satisfies a PAPR threshold.

26. The method of claim 25, wherein the distributively located PRTs of the first PRT location sequence include PRTs located within the second bandwidth of the second CC interleaved with data tones of the second CC and are configured such that PAPR of the waveform of the one or more waveforms corresponding to the first CC and of a waveform of the one or more waveforms corresponding to the second CC satisfies a PAPR threshold.

27. The method of claim 25, wherein the one or more PRT location sequences include a second PRT location sequence of a plurality of distributively located PRTs, and wherein the distributively located PRTs of the second PRT location sequence are located within the second bandwidth of the second CC interleaved with data tones of the second CC and are configured such that PAPR of a waveform of the one or more waveforms corresponding to the second CC satisfies the PAPR threshold.

28. The method of claim 19, wherein the first CC and the second CC are CCs of an intra-band carrier aggregation (CA) configuration, and wherein the first bandwidth of the first CC and the second bandwidth of the second CC are within a first frequency range predefined for the intra-band CA configuration.

29. The method of claim 19, wherein the first CC and the second CC are CCs of a carrier aggregation (CA) configuration, and wherein a frequency range of the first bandwidth of the first CC and a frequency range of the second bandwidth of the second CC are contiguous.

30. An apparatus configured for wireless communication, the apparatus comprising:
 a memory; and
 at least one processor in electrical communication with the memory, wherein the at least one processor is configured to cause the apparatus to:
  transmit, by a base station, resource allocation indicating data tones and peak reduction tones (PRTs) with respect to each component carrier (CCs) of a plurality of CCs, wherein the resource allocation indicates data tone locations within a first bandwidth of a first CC of the plurality of CCs and within a second bandwidth of a second CC of the plurality of CCs, and wherein the resource allocation indicates PRT locations within at least one of the first bandwidth or the second bandwidth according to one or more PRT location sequences; and
  receive, by the base station, a data transmission comprising one or more waveforms configured according to the resource allocation.

31. The apparatus of claim 30, wherein the one or more PRT location sequences provide a PRT sideband location configuration relative to data tones of the first CC, the second CC, or both.

32. The apparatus of claim 30, wherein the one or more PRT location sequences include a first PRT location sequence of a plurality of contiguously located PRTs, and wherein the contiguously located PRTs of the first PRT location sequence are located within the first bandwidth of the first CC and are configured such that peak to average power ratio (PAPR) of a waveform of the one or more waveforms corresponding to the first CC and of a waveform of the one or more waveforms corresponding to the second CC satisfies a PAPR threshold.

33. The apparatus of claim 30, wherein the one or more PRT location sequences provide a PRT inband location configuration relative to data tones of the first CC, the second CC, or both.

34. The apparatus of claim 30, wherein the one or more PRT location sequences include a first PRT location sequence of a plurality of distributively located PRTs, and wherein the distributively located PRTs of the first PRT location sequence are located within the first bandwidth of the first CC interleaved with data tones of the first CC and are configured such that peak to average power ratio (PAPR) of a waveform of the one or more waveforms corresponding to the first CC satisfies a PAPR threshold.

35. The apparatus of claim 30, wherein the first CC and the second CC are CCs of an intra-band carrier aggregation (CA) configuration, and wherein the first bandwidth of the first CC and the second bandwidth of the second CC are within a first frequency range predefined for the intra-band CA configuration.

36. The apparatus of claim 30, wherein the first CC and the second CC are CCs of a carrier aggregation (CA) configuration, and wherein a frequency range of the first bandwidth of the first CC and a frequency range of the second bandwidth of the second CC are contiguous.

* * * * *